US012581226B2

(12) United States Patent
Betlehem et al.

(10) Patent No.: US 12,581,226 B2
(45) Date of Patent: Mar. 17, 2026

(54) EAR-WEARABLE DEVICE WITH ACTIVE NOISE CANCELLATION SYSTEM THAT USES INTERNAL AND EXTERNAL MICROPHONES

(71) Applicant: STARKEY LABORATORIES, INC., Eden Prairie, MN (US)

(72) Inventors: Terence Betlehem, Eden Prairie, MN (US); Wenyu Jin, Eden Prairie, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 431 days.

(21) Appl. No.: 18/017,072

(22) PCT Filed: Jul. 12, 2021

(86) PCT No.: PCT/US2021/041222

§ 371 (c)(1),
(2) Date: Jan. 19, 2023

(87) PCT Pub. No.: WO2022/020122

PCT Pub. Date: Jan. 27, 2022

(65) Prior Publication Data

US 2023/0300516 A1 Sep. 21, 2023

Related U.S. Application Data

(60) Provisional application No. 63/054,443, filed on Jul. 21, 2020.

(51) Int. Cl.
*G10L 21/0224* (2013.01)
*G10K 11/178* (2006.01)
(Continued)

(52) U.S. Cl.
CPC ..... *H04R 1/1083* (2013.01); *G10K 11/17817* (2018.01); *G10K 11/17854* (2018.01);
(Continued)

(58) Field of Classification Search
CPC .......................... H04R 1/1083; H04R 25/505; H04R 2460/01; G10K 11/17817;
(Continued)

(56) References Cited

U.S. PATENT DOCUMENTS 5,852,667 A 12/1998 Pan et al.
7,590,254 B2 9/2009 Olsen
(Continued)

FOREIGN PATENT DOCUMENTS

EP 2 071 875 B1 12/2008

OTHER PUBLICATIONS

Markus Guldenschuh,“New Approaches for Active Noise Control Headphones”, Oct. 23, 2014, XP055454706, Graz [retrieved on Feb. 27, 2018] (Year: 2014).*
(Continued)

*Primary Examiner* — Carolyn R Edwards
*Assistant Examiner* — Friedrich Fahnert
(74) *Attorney, Agent, or Firm* — Mueting Raasch Group

(57) ABSTRACT

An ear-wearable device is operable to receive a reference signal from outside an ear canal of a user and an error signal from inside of the ear canal. A physical propagation path between the outside and inside of the ear canal defines a primary path, and amplified sound produced inside of the ear canal propagates over a secondary path to combine with direct noise at the ear canal. A noise signal inside the ear canal is estimated from the reference signal based on estimate of the primary and secondary paths. The estimated noise signal and the error signal are used to produce coef-
(Continued)

ficients of an adaptive filter. The adaptive filter is used to produce an anti-noise signal, which is used actively cancel noise in the ear canal.

20 Claims, 14 Drawing Sheets

(51) Int. Cl.
*H04R 1/10* (2006.01)
*H04R 25/00* (2006.01)

(52) U.S. Cl.
CPC ........ *G10L 21/0224* (2013.01); *H04R 25/505* (2013.01); *G10K 2210/1081* (2013.01); *G10K 2210/30232* (2013.01); *H04R 2460/01* (2013.01)

(58) Field of Classification Search
CPC ..... G10K 11/17854; G10K 2210/1081; G10K 2210/30232; G10K 2210/3055; G10K 11/17881; G10K 11/17815; G10L 21/0224
USPC ........................................................ 381/71.6
See application file for complete search history.

(56) References Cited

U.S. PATENT DOCUMENTS

| | | | | |
|---|---|---|---|---|
| 7,650,004 | B2 | 1/2010 | Durant | |
| 8,355,794 | B2 | 1/2013 | Lineaweaver et al. | |
| 9,082,389 | B2 | 7/2015 | Nicholson et al. | |
| 9,607,602 | B2 | 3/2017 | Po et al. | |
| 9,922,636 | B2 | 3/2018 | Ku | |
| 10,199,029 | B2 | 2/2019 | Hsu et al. | |
| 11,503,409 | B1 * | 11/2022 | Nawfal | H04R 5/04 |
| 2010/0272281 | A1 * | 10/2010 | Carreras | G10K 11/17853 381/71.6 |
| 2011/0293103 | A1 * | 12/2011 | Park | G10K 11/17854 381/57 |
| 2015/0243271 | A1 * | 8/2015 | Goldstein | G10K 11/17854 381/71.6 |
| 2020/0382859 | A1 * | 12/2020 | Woodruff | H03G 3/3005 |
| 2021/0266656 | A1 * | 8/2021 | Tsuchihashi | G10K 11/172 |
| 2021/0409860 | A1 * | 12/2021 | Bean | H04R 1/1091 |

OTHER PUBLICATIONS

Cerqueira André et al: “Active Noise Control Headphones”, Nov. 30, 2016 (Nov. 30, 2016), pp. 1-10, XP055855575, Retrieved from the Internet: URL:https://fenix.tecnico.ulisboa.pt/downloadFile/1689244997257201/ExtendedAbstract. pdf [retrieved on Oct. 27, 2021] (Year: 2016).*

Guldenschuh (“New Approaches for Active Noise Control Headphones”, Oct. 23, 2014 (Year: 2014).*

Cerqueira (“Active Noise Control Headphones”, Nov. 30, 2016 (Year: 2016).*

International Application No. PCT/US2021/041222, filed Jul. 12, 2021; International Search Report and Written Opinion issued Nov. 5, 2021, 11 pages.

International Application No. PCT/US2021/041222, filed Jul. 12, 2021; International Preliminary Report on Patentability issued Feb. 2, 2023, 8 pages.

Akhtar, “An Adaptive algorithm, based on modified tanh non-linearity and fractional processing, for impulsive active noise control systems,” *Journal of Low Frequency Noise, Vibration and Active Control,* 2017, 14 pages.

Bao et al., “A Novel Feedforward Active Noise Control Structure with Spectrum-tuning for Residual Noise”, *IEEE Transactions on Consumer Electronics,* Dec. 2010, 6 pages.

Cerqueira et al., “Active Noise Control Headphones”, Nov. 30, 2016, XP055855575, retrieved from the Internet: URL: https://fenix.tecnico.ulisboa.pt/downoadFile/1689244997257201/ExtendedAbstract.pdf>, 10 pages.

Chang et al., “Listening in a Noisy Environment: Integration of active noise control in audio products”, Oct. 1, 2016, *IEEE Consumer Electronics Magazine,* IEEE, Piscataway, NJ, US 5(4): pp. 34-43.

Chen, et al., “Adaptive feedback noise control with leaky FeLMS algorithm,” *Internoise,* 2014, 10 pages.

Guldenschuh, “New Approaches for Active Noise Control Headphones”, Oct. 23, 2014, XP055454706, retrieved from the Internet: URL: https://iem.kug.ac.at/fileadmin/media/iem/projects/2010/guldenschuh_diss.pdf.

Kuo et al., “Residual noise shaping technique for active noise control systems,” *Journal of the Acoustical Society of America,* vol. 95, p. 1665, 1994. <https://doi.org/10.1121/1.408555>.

* cited by examiner

EAR-WEARABLE DEVICE WITH ACTIVE NOISE CANCELLATION SYSTEM THAT USES INTERNAL AND EXTERNAL MICROPHONES

The present application is a § 371 National Stage application of PCT/US2021/041222 with an international filing date of Jul. 12, 2021, which claims the benefit of U.S. Provisional Patent Application No. 63/054,443, filed Jul. 21, 2020, both of which are incorporated herein by reference in their entireties.

SUMMARY

This application relates generally to ear-level electronic systems and devices, including hearing aids, personal amplification devices, and hearables. In one embodiment, an ear-wearable device includes a reference microphone producing a reference signal in response to external sound outside an ear canal of a user. The device includes an error microphone producing an error signal in response to sound inside of the ear canal. A physical propagation path between the reference microphone and the error microphone defines a primary path. The device includes a receiver that produces amplified sound inside of the ear canal. The amplified sound propagates over a secondary path to combine with direct noise at the ear canal, the combination of which is sensed by the error microphone to produce the error signal.

The ear-wearable device includes a processor coupled to the reference microphone, the error microphone, and the receiver. The processor is operable via instructions to: estimate a noise signal from inside the ear canal from the reference signal by filtering with an equalization filter that is based on an estimate of the secondary path and by filtering with a spectrum shaping filter that is based on an estimate of the primary path; input the estimated noise signal from inside the ear canal and the estimated residual noise signal into a least mean square (LMS) algorithm, the LMS algorithm producing coefficients of an adaptive filter; and apply the adaptive filter to the reference signal to produce an anti-noise signal. The anti-noise signal is reproduced by the receiver to actively cancel noise in the ear canal.

The above summary is not intended to describe each disclosed embodiment or every implementation of the present disclosure. The figures and the detailed description below more particularly exemplify illustrative embodiments.

BRIEF DESCRIPTION OF THE DRAWINGS

The discussion below makes reference to the following figures.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Embodiments disclosed herein are directed to noise reduction in an ear-worn or ear-level electronic device. Such a device may include cochlear implants and bone conduction devices, without departing from the scope of this disclosure. The devices depicted in the figures are intended to demonstrate the subject matter, but not in a limited, exhaustive, or exclusive sense. Ear-worn electronic devices (also referred to herein as “hearing aids,” “hearing devices,” and “ear-wearable devices”), such as hearables (e.g., wearable earphones, ear monitors, and earbuds), hearing aids, hearing instruments, and hearing assistance devices, typically include an enclosure, such as a housing or shell, within which internal components are disposed.

Typical components of a hearing device can include a processor (e.g., a digital signal processor or DSP), memory circuitry, power management and charging circuitry, one or more communication devices (e.g., one or more radios, a near-field magnetic induction (NFMI) device), one or more antennas, one or more microphones, buttons and/or switches, and a receiver/speaker, for example. Hearing devices can incorporate a long-range communication device, such as a Bluetooth® transceiver or other type of radio frequency (RF) transceiver.

The term hearing device of the present disclosure refers to a wide variety of ear-level electronic devices that can aid a person with impaired hearing. The term hearing device also refers to a wide variety of devices that can produce processed sound for persons with normal hearing. Hearing devices include, but are not limited to, behind-the-ear (BTE), in-the-ear (ITE), in-the-canal (ITC), invisible-in-canal (IIC), receiver-in-canal (RIC), receiver-in-the-ear (RITE) or completely-in-the-canal (CIC) type hearing devices or some combination of the above. Throughout this disclosure, reference is made to a “hearing device” or “ear-wearable device,” which are understood to refer to a system comprising a single left ear device, a single right ear device, or a combination of a left ear device and a right ear device.

Embodiments described below include features that reduce the transmission of ambient noise to a user of a hearing device. Ambient noise exists everywhere in our daily environment, such as in a car, in an airplane cabin, or at places near a road, fan etc. Such noise has a significant amount of low-frequency energy and thus strong penetration capability. When a hearing aid (HA) user is exposed to an environment with such noise, the low-frequency part of the noise can bypass the hearing aids and enter the ear canal directly due to relatively longer wavelength. This results in direct noise in the ear canal that causes discomfort, fatigue, and degraded speech intelligibility.

Figure 1:
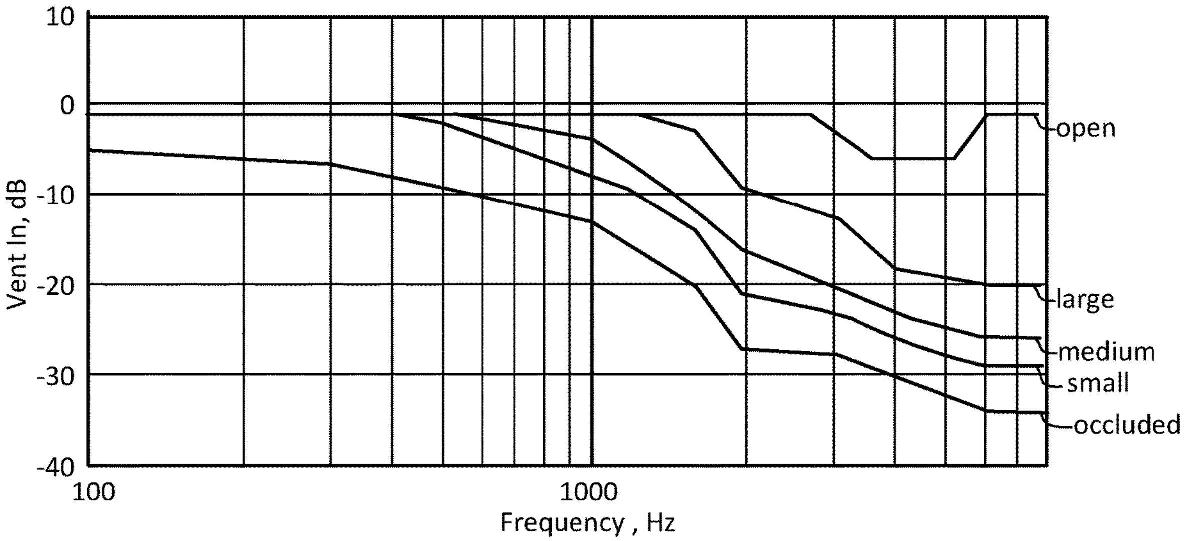
FIG. 1 is a graph showing simulation results of noise attenuation of a hearing device according to an example embodiment.

In FIG. 1, a graph shows simulated acoustic transparency for a hearing aid according to an example embodiment. Each curve corresponds to a different attenuation of ambient sound for various fittings of a hearing aid, from fully occluded to fully open. This illustrates that even with a tight fitting, significant low frequency ambient noise components (e.g., less than 1 kHz) can be directly coupled into the ear canal.

Current HA noise reduction algorithms are designed to reduce noise that goes through the signal path of the HAs. Because these signals originate from a microphone, the noise that propagates directly into the ear canal cannot be corrected for by noise reduction algorithms. In embodiments described below, an active noise cancellation (ANC) system is described that is usable on HA devices. In one embodiment, the ANC system deploys a modified hybrid-structure to cancel the component of the direct ambient noise in the acoustic domain, with emphasis on low frequency ranges (i.e. <1500 Hz). A receiver (e.g., loudspeaker) is placed in the ear canal to generate an anti-phase signal based on the signals of one or both of an error microphone (ear-canal) and a reference microphone (external) in order to fully cancel or significantly reduce noise inside the ear canal already. The HA in these embodiments may include an occluded fitting or vented fitting with vent size 1.8 mm or smaller.

Figure 2:
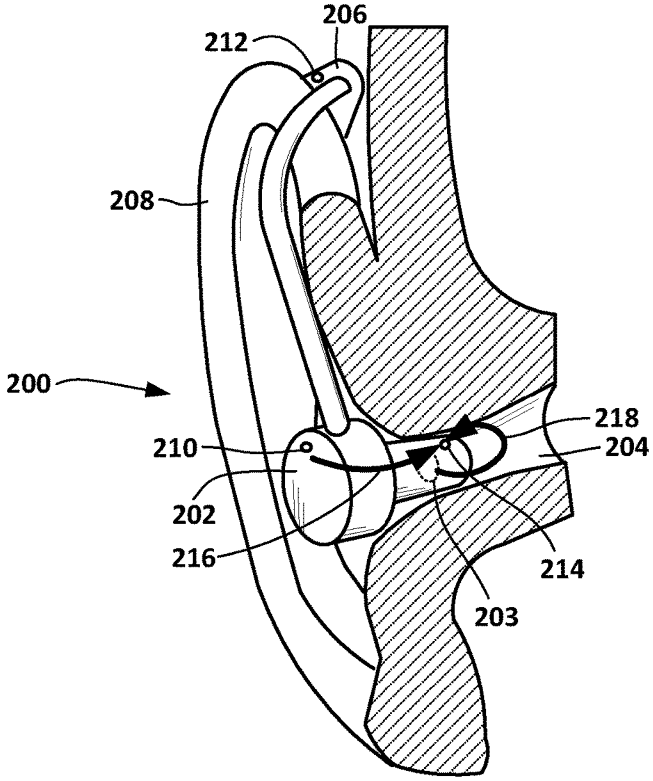
FIG. 2 is an illustration of a hearing device according to an example embodiment.

In FIG. 2, a diagram illustrates an example of an ear-wearable device 200 according to an example embodiment. The ear-wearable device 200 includes an in-ear portion 202 that fits into the ear canal 204 of a user. The ear-wearable device 200 may also include an external portion 206, e.g., worn over the back of the outer ear 208. The external portion 206 is electrically and/or acoustically coupled to the internal portion 202. The in-ear portion 202 may include a receiver 203, although in some embodiments the receiver may be in the external portion 206. Similarly, one or both portions 202, 204 may include an external microphone, as indicated by respective microphones 210, 212.

For purposes of ANC, the device 200 may also include an internal microphone 214 that detects sound inside the ear canal 204. The internal microphone 214 may also be referred to as an error microphone, as it can detect differences (errors) between noise detected in the ear canal 204 and anti-nose, which is an artificially generated signal output by the receiver to cancel out the noise within the ear canal 204. For purposes of the following discussion arrows 216 and 218 represent respective primary and secondary paths that will be represented as physical elements of an ANC implementation. The primary path 216 is a physical propagation path from the external reference microphone (in this example microphone 210) to the in-ear error microphone 214. The secondary path 218 is the physical propagation path from receiver 203 to the error microphone 214.

There are challenges in deploying ANC into an HA or similar device due to their relatively limited computing resources. For example, an adaptive filtering implementation on HA devices may have a relatively small number of taps, making it difficult to accurately characterize the primary path impulse responses due to the strong resonance mainly at high frequencies. Another challenge in implementing ANC in a HA is the tendency of an HA to shift positions, e.g., due to loose fit, movement of the wearer, etc. Noise suppression systems have been shown to be vulnerable to the change of noise source direction-of arrival angle or wearing angle of the devices that leads to primary path mismatch due to the non-causality issue. Non-causality generally refers to situations where sound arrives at the in-ear microphone 214 before the arrival at the external microphone 210.

Figure 3:
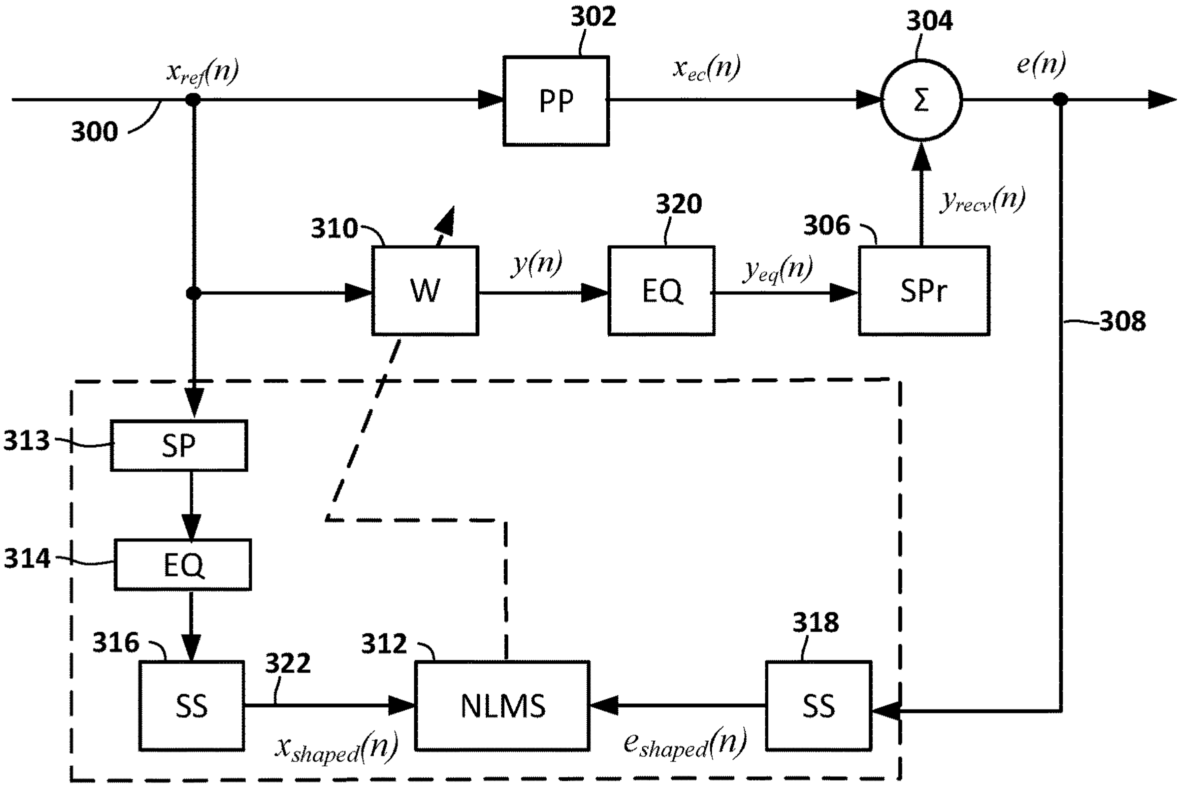
FIG. 3 is a schematic diagram of an active noise canceller according to an example embodiment.

In some embodiments described below, a hybrid ANC system is described that uses spectrum shaping and primary path equalization schemes that overcome these constraints of HA. In FIG. 3, a schematic diagram shows an ANC system according to an example embodiment. A reference signal 300 ($x_{ref}(n)$) originates from an external microphone. The reference 300 signal will include at least free field noise, and the signal may include other components of interest (e.g., speech). The primary path 302 results in the free field noise $x_{ref}(n)$ being observed as direct noise in the ear canal $x_{ec}(n)$, where it is combined with the output $y_{recv}(n)$ of receiver 306 as indicated by summation block 304. The receiver's output $y_{recv}(n)$ includes anti-noise, which has a phase and amplitude that cancels at least some of the direct noise to produce an error signal 308 (e(n)).

The anti-noise signal is produced by an adaptive filter 310, e.g., finite impulse response (FIR) filter. The filter 310 is adapted via a least mean squares (LMS) algorithm, in this example a normalized least mean squares (NLMS) algorithm 312. The NLMS algorithm 312 is selected to operate effectively for noise cancellation in hearing aids, as discussed further below. The inputs to the NLMS algorithm include one or both of the reference signal 300 and the error signal 308. The reference signal 300 may be equalized via equalizer 314 and passed through a spectrum shaping (SS) filter 316. The error signal 308 may also be processed by an SS filter 318, which is based on an approximation of the primary path 302. The output of the variable filter 310 is also shaped via equalizer 320 before being reproduced via the receiver 306.

As noted above, the ANC attenuates the direct noise at ear-canal $x_{ec}(n)$ by broadcasting from the receiver 306 an anti-noise signal $y_{recv}(n)$ that has a similar magnitude envelope as $x_{ec}(n)$ but a phase difference of about 180 degrees with respect to $x_{ec}(n)$. As such, $x_{ec}(n)$ and $y_{recv}(n)$ would cancel each other when they meet and a quiet zone (near the eardrum) can be created. The system shown in FIG. 3 may be considered an adaptive feedforward approach, in that the adaptive filter 310 that develops the anti-noise signal includes inputs 300, 308 from both the external microphone (feedforward input) and the error microphone (feedback input).

The signal received by the error microphone is the residual noise signal resulting from the linear superposition of the noise in the ear canal and the anti-noise signal $y_{recv}(n)$ arriving from the receiver driver 306. The error microphone signal 308 and a secondary path filtered version $x_{shaped}(n)$ of the residual signal 300 are input into a least mean square (LMS) algorithm, the LMS algorithm producing coefficients of the adaptive filter 310.

The residual noise e(n) is passed to the ANC through the error microphone directly, along with the signal 300 from the reference microphone that is placed externally and is closer to the direct noise. The primary path 302 is the physical propagation path from the external reference microphone to the in-ear error microphone. The impulse response of the so-called secondary path (SP) includes the receiver 306, the acoustic summation point 304 and the in-ear microphone. The reference noise estimate $x_{shaped}$ (n) is fed to drive the adaptive filter W(z) 310 to produce the anti-noise. The spectrum shaping filter 316 includes weighting coefficients for various frequency ranges to reduce the effect of high-frequency resonances in the primary path 302.

The filtered-X NLMS (FX-NLMS) algorithm is computationally the simplest among common adaptive algorithms. It aims at minimizing the cost function $e_{shape}^2$ (n) using the gradient descent algorithm (see, e.g., Haykin, "Adaptive Filter Theory"). The updating of W(n) at time instant n is achieved by sequentially evaluating Equations 1(a)-1(c) below, where: $W(n)=[W_1(n), W_2(n), \ldots, W_N(n)]^T$ denotes the column vector containing the N coefficients of the adaptive filter W(z) at time instant n $x_{shape}(n)=[x_1(n), x_2(n), \ldots, x_N(n)]^T$ contains the most recent N output samples of X-filter $H_x(z)$; u is the step size; $P_x(n)$ and $P_e(n)$ are the estimates of the absolute amplitudes of the X-filter output $x_{shape}(n)$ and the error signal $e_{shape}(n)$; and β is a small positive number serving as the forgetting factor in computing $P_x(n)$ and $P_e(n)$.

$$W(n) = (1 - 2^{-g})W(n-1) + \frac{u}{(P_x(n) + P_e(n))^2} e_{shape}(n) x_{shape}(n) \quad 1(a)$$

$$P_x(n) = (1-\beta)P_x(n) + \beta |x_{shape}(n)| \quad 1(b)$$

$$P_e(n) = (1-\beta)P_e(n) + \beta |e_{shape}(n)| \quad 1(c)$$

An alternative to the FxNLMS algorithm is the RLS algorithm. The RLS algorithm provides faster adaptation of the filter coefficients, but at a higher computational complexity. The algorithm is also more sensitive to impulsive noise sources. Impulsive noise describes a noise process that has a rapid of onset of a very high amplitude signal. To address the issues of computational complexity and impulsive noise sensitivity, an FxRLS-FxLMS hybrid algorithm approach has been proposed. Another way of reducing the sensitivity to impulsive noise is to introduce a tan h nonlinearity. This non-linearity is inserted just after the spectrum shaping filters 316 and 318.

Evaluation of the hybrid ANC shown in FIG. 3 in terms of its noise attenuation ability using recorded noise files indicates that performance depends on the characteristics of the secondary and primary paths. At least three prominent factors have been identified: the SP delay, the dynamic range of the PP magnitude response, and the non-causal components of the PP. The latter refers to the sound components that arrive at the in-ear microphone before the arrival at the external microphone due to certain noise source direction of arrival.

Figure 4A:
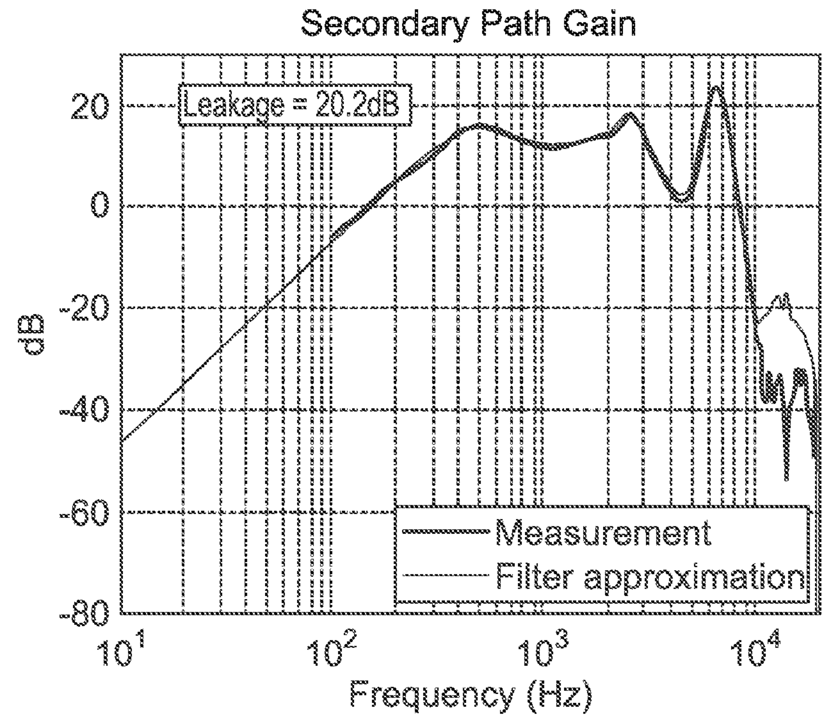
FIGS. 4A and 4B are graphs showing gain and group delay of a secondary path model used in a hearing device according to an example embodiment.
Figure 4B:
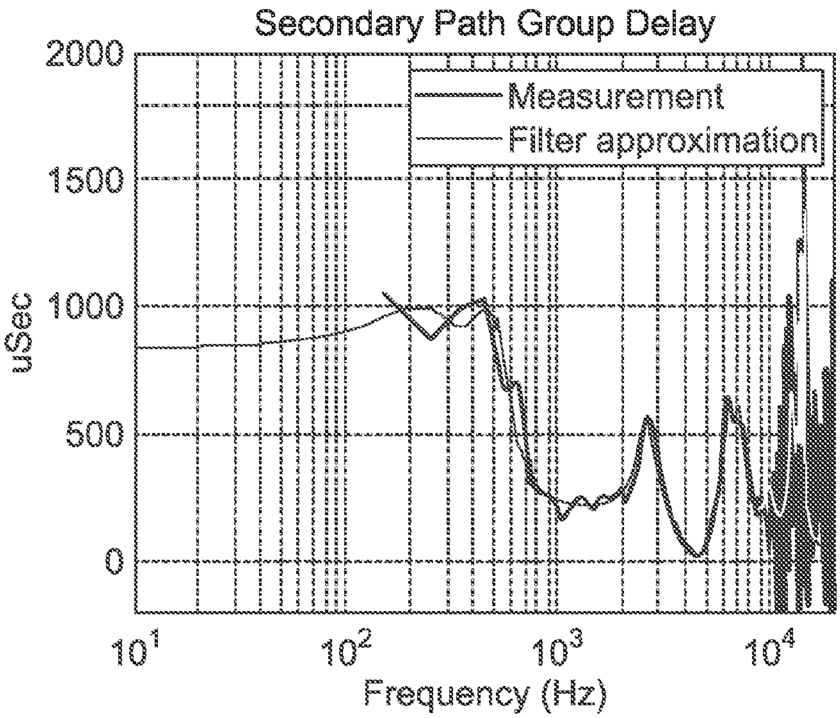

The ANC shown in FIG. 3 estimates the direct noise x(n) from the reference microphone using its SP-filtered version $x_{shape}(n)$. The SP delay limits the performance of the FANCs via reducing the correlation between x(n) and $x_{shape}(n)$. The SP delay can be compensated if it is a minimum phase impulse response. The gain and group delay of the SP under consideration are shown in the graphs of FIGS. 4A-B. The actual SP has zeros outside of the unit circle and as a result, it is a non-minimum phase system, which makes it difficult to fully compensation for the SP delay.

Figure 5A:
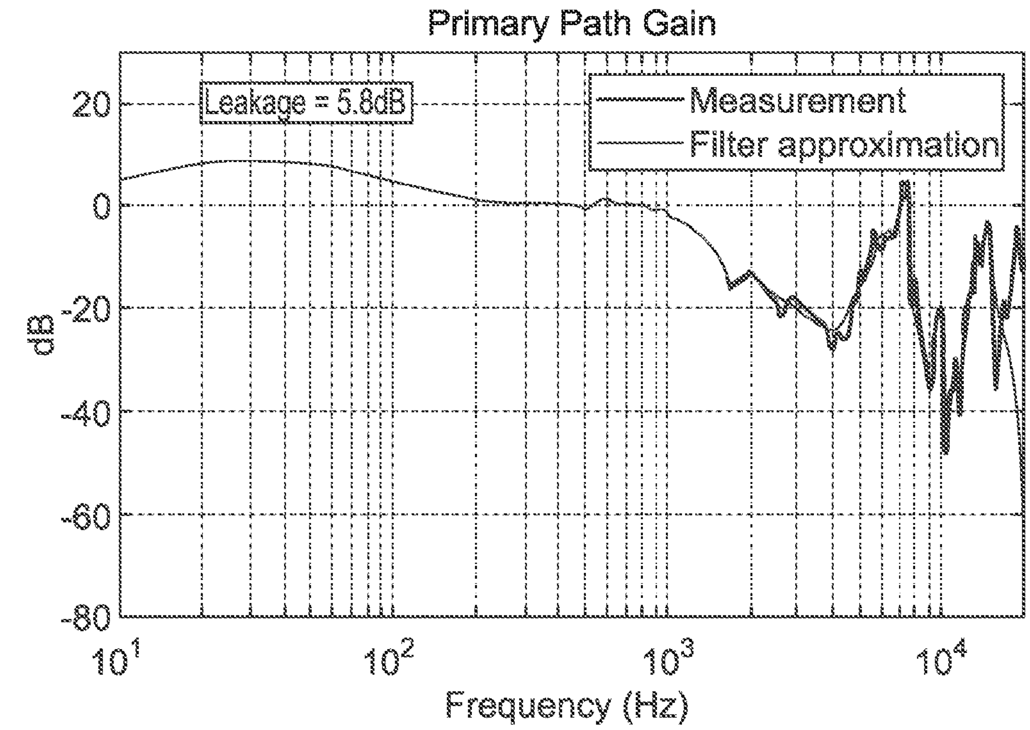
FIGS. 5A and 5B are graphs showing gain and group delay of a primary path model used in a hearing device according to an example embodiment.
Figure 5B:
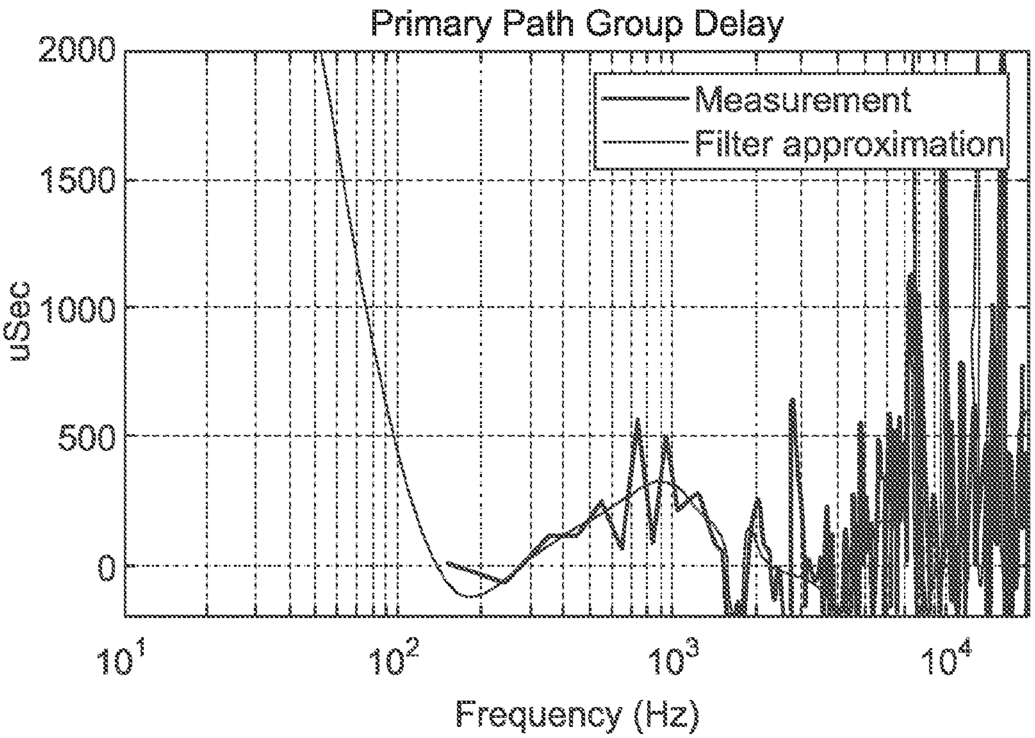

The gain and group delay of the PP in consideration are shown in the graphs of FIGS. 5A-B. It can be seen that the PP greatly attenuates the signal beyond 1000 Hz and moreover, the dynamic range of its gain in 5 k-6 k Hz reaches a value of −36 dB. The large dynamic range increases the difficulty for the adaptive filter W(z) to compensate the PP gain loss and is hard to achieve using W(z) that is an FIR filter with a limited tap length. Even if the filter order could be increased to obtain improved PP gain approximation, the increased delay of W(z) in the signal path may in turn degrade the noise attenuation ability.

In order to address these issues, the FX-NLMS and FX-RLS algorithms may be guided to focus on a desired frequency region and make it fit the requirement of adaptive filtering with short filter lengths. Unlike the Frequency-domain Adaptive Filtering (FDAF), the FX-NLMS and the FX-RLS based adaptive filtering have equal control over their operational frequency region. However, in the applications to hearing aids it may be desirable to focus on certain low frequencies instead of the whole band as it effectively rolls off the resonance and reduces the effective length of the PP impulse responses such that it fits the FxNLMS system with limited filter length on hearing aids. The reason that PP is highlighted in this context (instead of SP) is that PP impulse response typically has a longer effective length as the external microphone and in-ear mic are more physically separated and the primary path involves the effects of human ear pinna.

Figure 6:
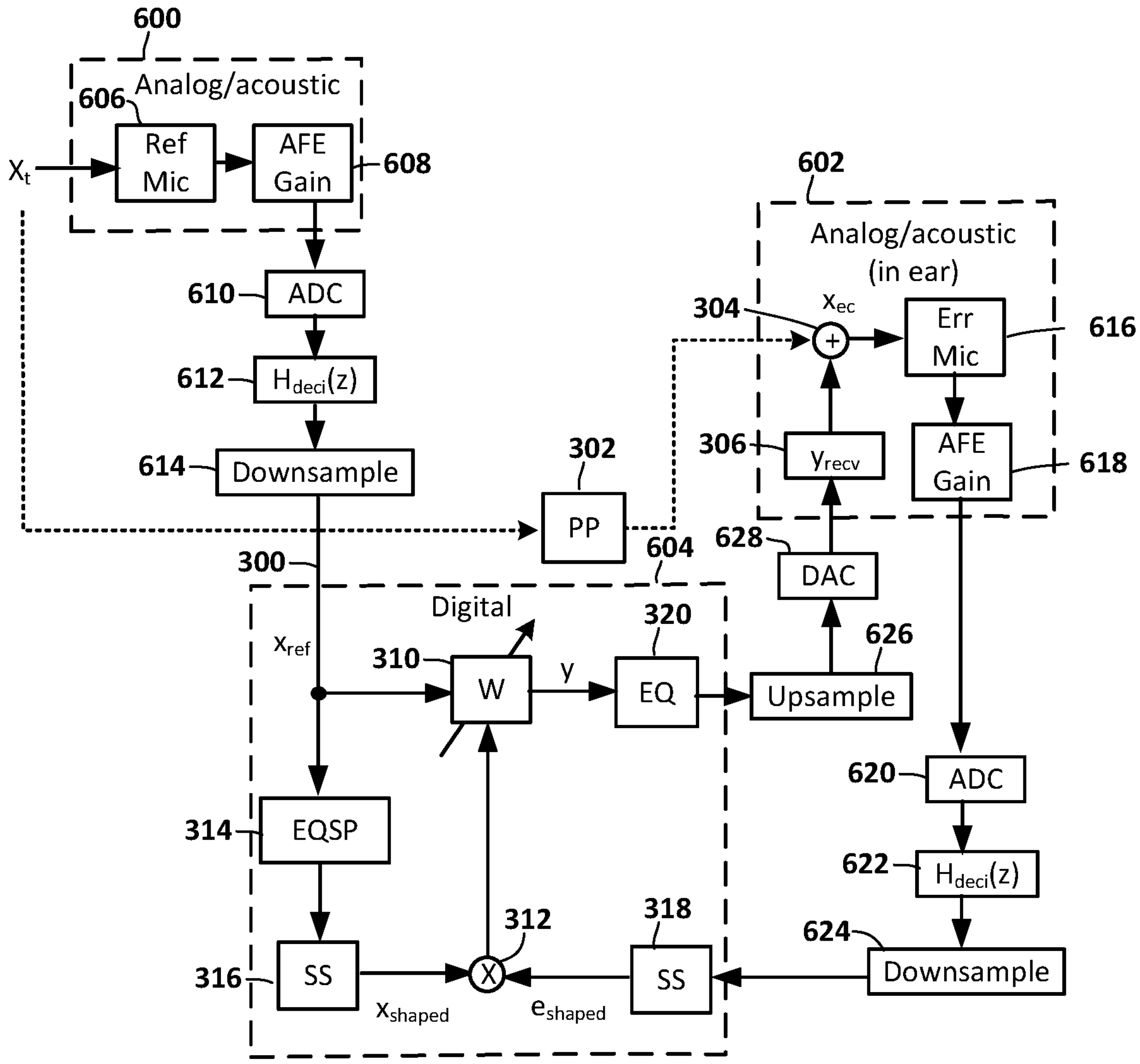
FIGS. 6 and 7 are block diagrams showing an active noise cancellation systems according to various embodiments.

In FIG. 6, a block diagram shows the ANC system of FIG. 3 with additional system components according to an example embodiment. Boxes 600, 602 represent analog and acoustic components, and box 604 represent digital operations. The free field noise Xt is received by a reference microphone 606, the output of which is conditioned (e.g., amplified) by an analog front end (AFE) 608. The output of the AFE 608 is converted to digital via an analog-to-digital converter (SDC) 610. The digitized signal is processed by a decimation filter 612 and downsampler 614. The output ($x_{ref}$ 300) of the downsampler 614 serves as both the feedforward input to ANC as well as the source signal that is adjusted via filter 310 to produce the anti-noise. As seen in block 602, which includes in-ear acoustic/analog components, an error microphone 616 receives the combination 304 of the primary path noise 302 with the output of the receiver 306. Similar to the reference microphone 606, the output of the error microphone 616 is processed via AFE 618, ADC 620, decimation filter 622 and downsampler 624. Also seen in FIG. 6 is an upsampler 626 (which would include interpolation filter) and digital-to-analog converter (DAC) 628.

Figure 7:
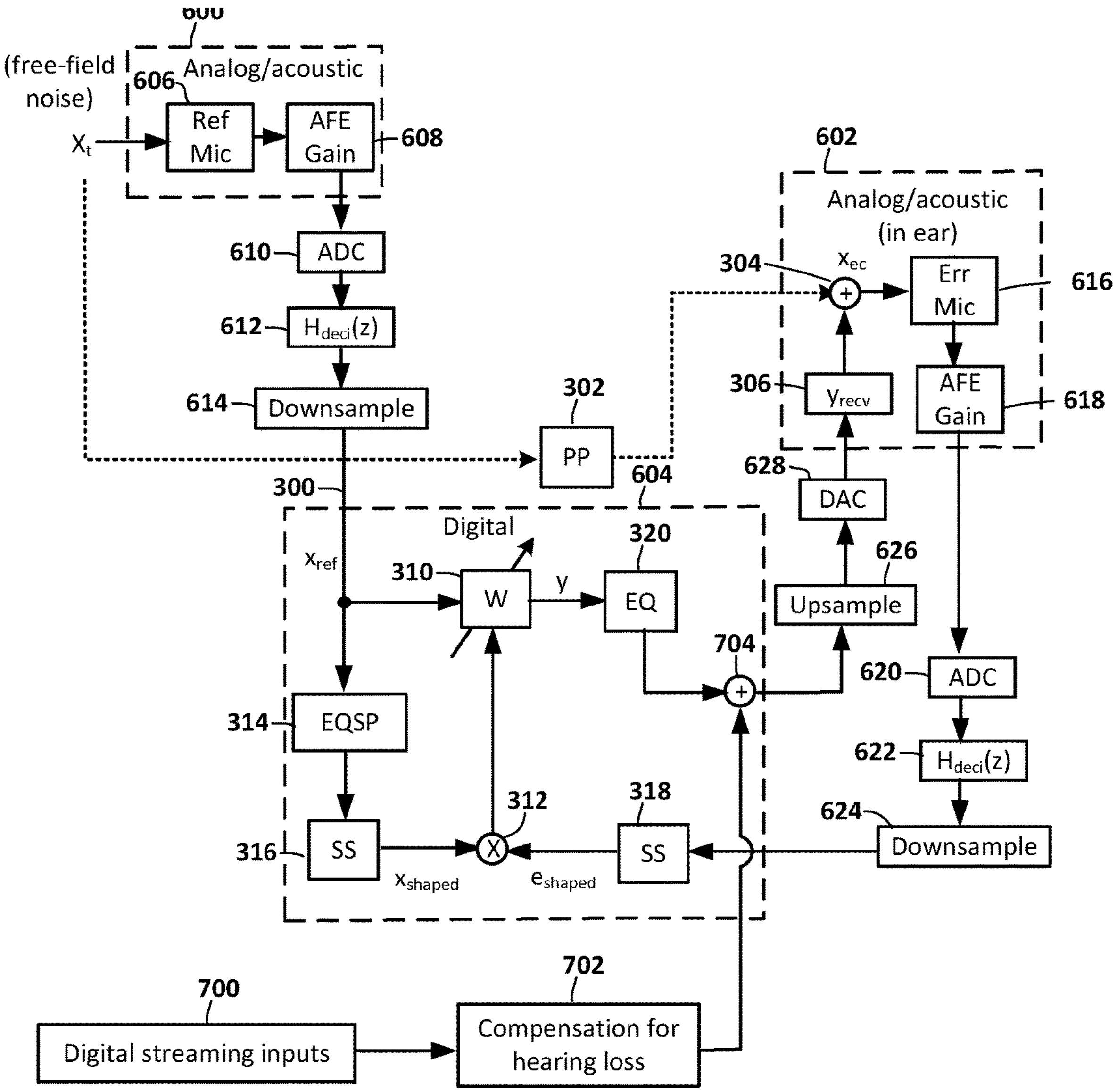

In FIG. 7, the system of FIG. 6 is shown with additional components of a hearing device according to an example embodiment. Block 700 processes streaming audio data of interest, e.g., speech, music, etc. This streaming audio may originate from the reference microphone 606 or another audio transducer (not shown). The processing by block 700 may include analog processing, ADC, etc. A compensation processing block 702 performs specific processing of the audio signal to compensate for hearing loss, such as speech recognition/enhancement, noise reduction, etc. The resulting hearing-loss-compensated audio signal is combined with the anti-noise at block 704.

In order to provide a feedback signal usable by the adaptive filter 310, the secondary path will be approximated so as to properly transform the signal received from the error microphone 616. In one embodiment, a test/calibration operation can involve sending a broadband digital stimulus from the device processor (e.g., based on a signal stored in memory) to the receiver 306. After the stimulus goes through the rest of the secondary path (e.g., acoustic coupling in the ear canal, error microphone 616 and its associated processing path), the response is stored by the processor on its memory. Due to the memory size constraints on the hearing device, the stimulus may be chosen as a periodic signal. For example, a complex tone may be used that includes a plurality of pure tones at frequencies of interest.

In one embodiment, the stimulus signal is formed with a sampling frequency of 80 kHz and includes tones of multiples of 100 Hz. The magnitudes of these tones have more emphasis on low frequencies to improve the poor signal-to-noise ratio (SNR) at low frequencies. The complex response of the secondary path is obtained taking the transfer function between the stimulus and the response stored on the hearing device memory. Averaging in the time domain can be used utilized to further increase the SNR.

The ANC system uses a secondary path equalization filter EQ 314 based on an estimate of the secondary path 313. $E_{sp}(z)$ is placed in the signal path while the other identical one is placed in the side branch that adjusts the coefficients of W(z). Note that the EQ 314 includes characteristics of the equalizer $E_{sp}(z)$, the receiver 306, the acoustic summation point 304 and the error microphone 616. This is also the underlying reason behind including equalization filter in the side branch to match the newly obtained SP with an equalizer.

In one embodiment, the SP equalizer includes three parts: a minimum-phase inversion of the SP; a 1st-order low-pass frequency with corner frequency 5 kHz; and second-order high-pass filter (12 db per octave band) with corner frequency dependent on the SP leakage (e.g., the magnitude difference of SP gain between 100 Hz and 1000 Hz). In Listing 1 below, a code listing how the high-pass filter corner frequency (HPFilt_eq_fc) in Hz can be chosen based on secondary path leakage (SPLeakage) in dB according to one example.

Listing 1

```
if SPLeakage > −6
    HPFilt_eq_fc = 25
elseif SPLeakage > −12
    HPFilt_eq_fc = 50
elseif SPLeakage > −18
    HPFilt_eq_fc = 100
elseif SPLeakage > −28
    HPFilt_eq_fc = 150
else
    HPFilt_eq_fc = 200
End
```

Figure 8:
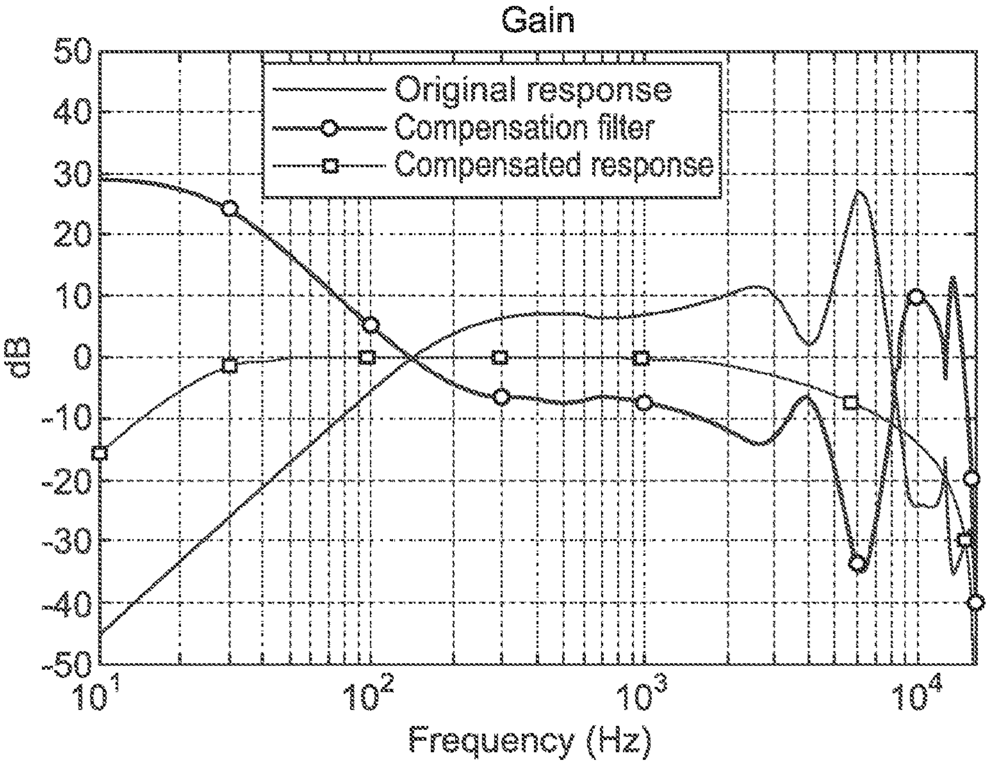
FIGS. 8 and 9 are graphs showing gain and group delay of a secondary path equalizer used in a hearing device according to an example embodiment.
Figure 9:
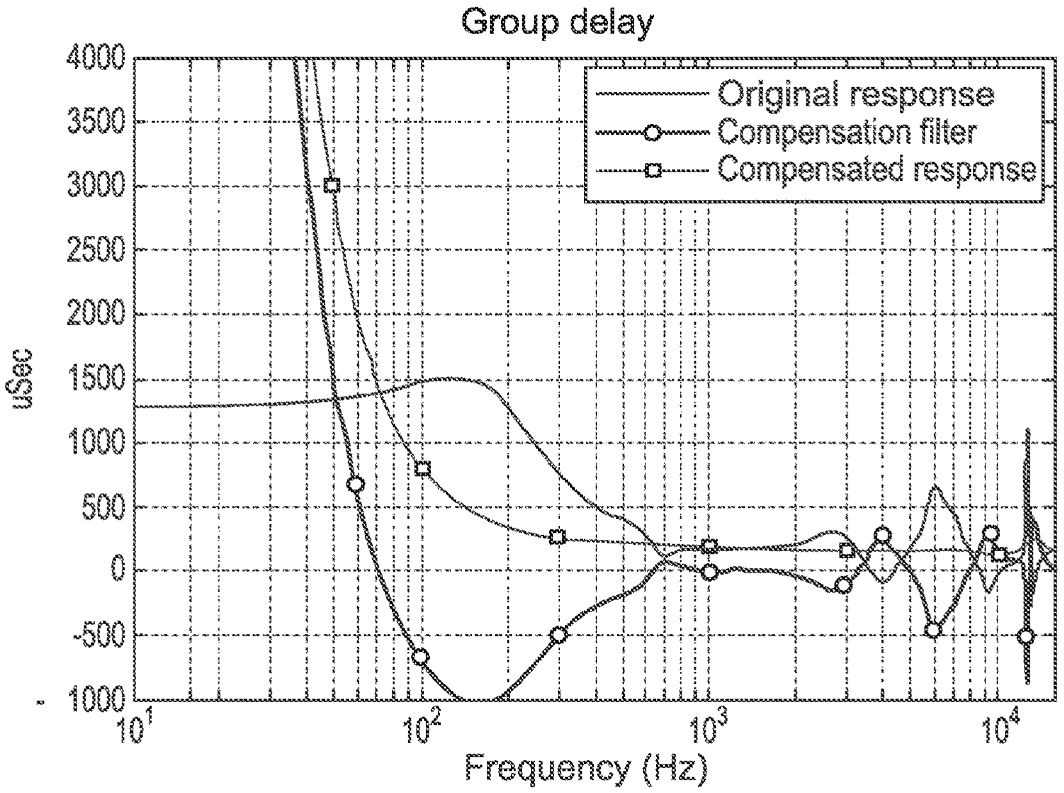

After obtaining an infinite impulse response (IIR) filter approximation of the SP, the SP is decomposed into two parts: a minimum-phase part, $SP_m$; and an all-pass part, $SP_a$. The minimum-phase part is invertible and its group delay can be fully compensated. The all-pass part is non-invertible thus preventing full compensation of the SP delay. The idea is to invert the minimum-phase part of the SP and leave the all-pass part intact. An example is given in the graphs of FIGS. 8 and 9, which show a designed compensation filter and compensated SP according to an example embodiment.

A hybrid control system with practical primary path models can be implemented in a hearing device, assuming that both external microphone and internal microphone are on the same low-delay DSP path. Using prototypes that deploy both external and in-ear microphones on in-the-canal (ITC) hearing aid shells, the primary path measurement was conducted using an overhead headset in order to alleviate the non-causal issue. An over-the ear, open-back set of headphones was put over the head with the hearing device inserted for the measurements of related transfer function responses. The response of the headphones were pre-equalized for a flat magnitude response at the eardrum and the complex tone stimulus noise level was pre-calibrated to be at 80 dB sound pressure level (SPL) at ear position. The goal was to define the derived primary path responses using inverse filter approach reduces the residual error e(n) as defined as in Equation (2) below.

$$e(n)=s_{inner}(n)-h_{pp}(n)*s_{outer}(n) \quad (2)$$

The length of the primary path filter used was 400, which is the maximum length available in the device firmware. It is also worthy to note that the length of the filters also affects the minimization of the residual error. Generally, the longer the filter length is, the smaller the error would be. The motivation for deploying this PP path measurement approach is to attenuate the non-causal components that lead to relatively large residual error in Equation (2). A reason for this residual error is that sound arriving at the inner microphone before arrives at the outer microphone for some noise fields including a diffuse noise field, which is a sign of non-causality. Impulse response and spectrum of this approach is shown in the graphs of FIGS. 10 and 11.

Figure 10:
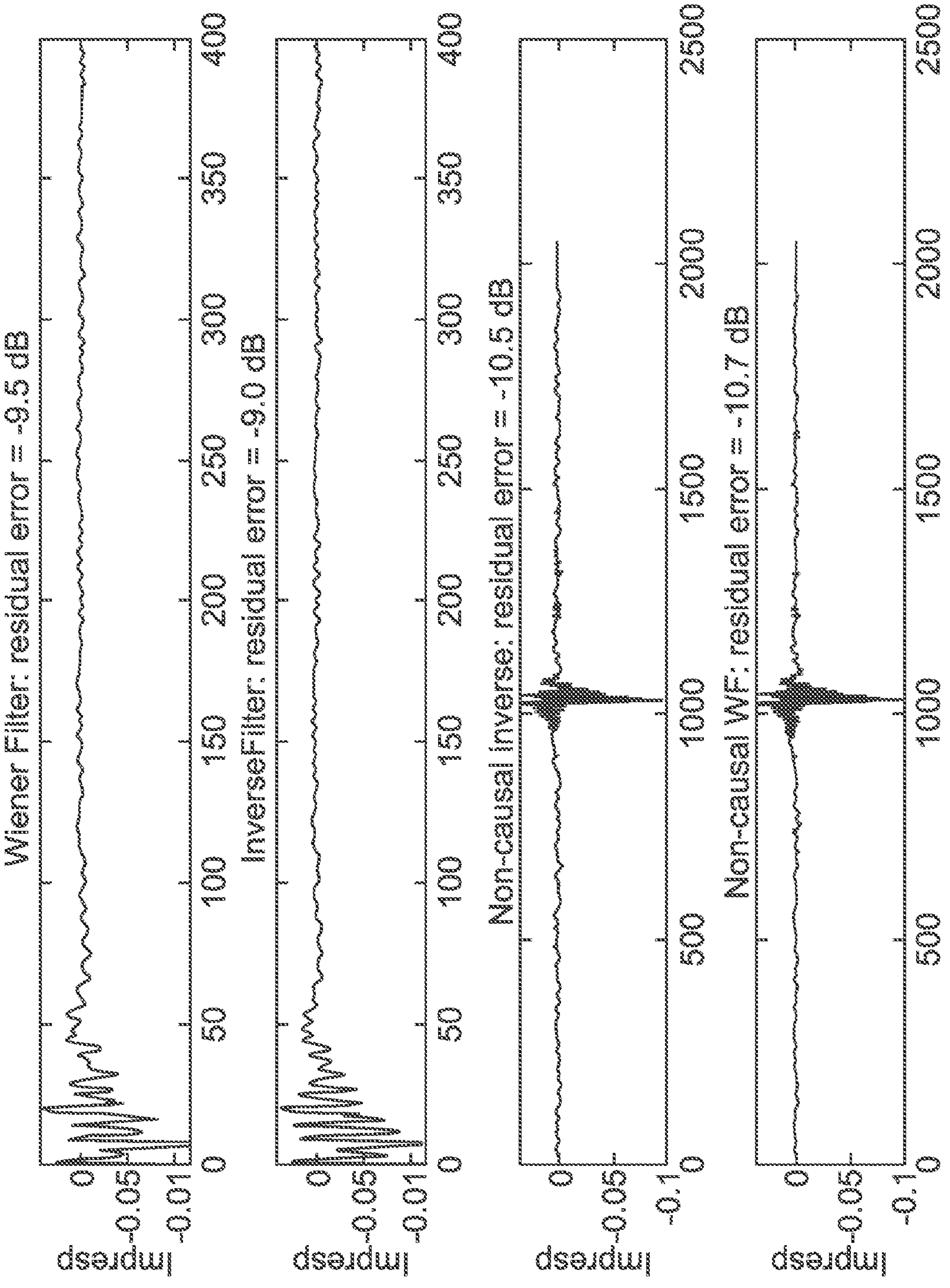
FIGS. 10 and 11 are graphs showing performance of a primary path filter according to an example embodiment.
Figure 11:
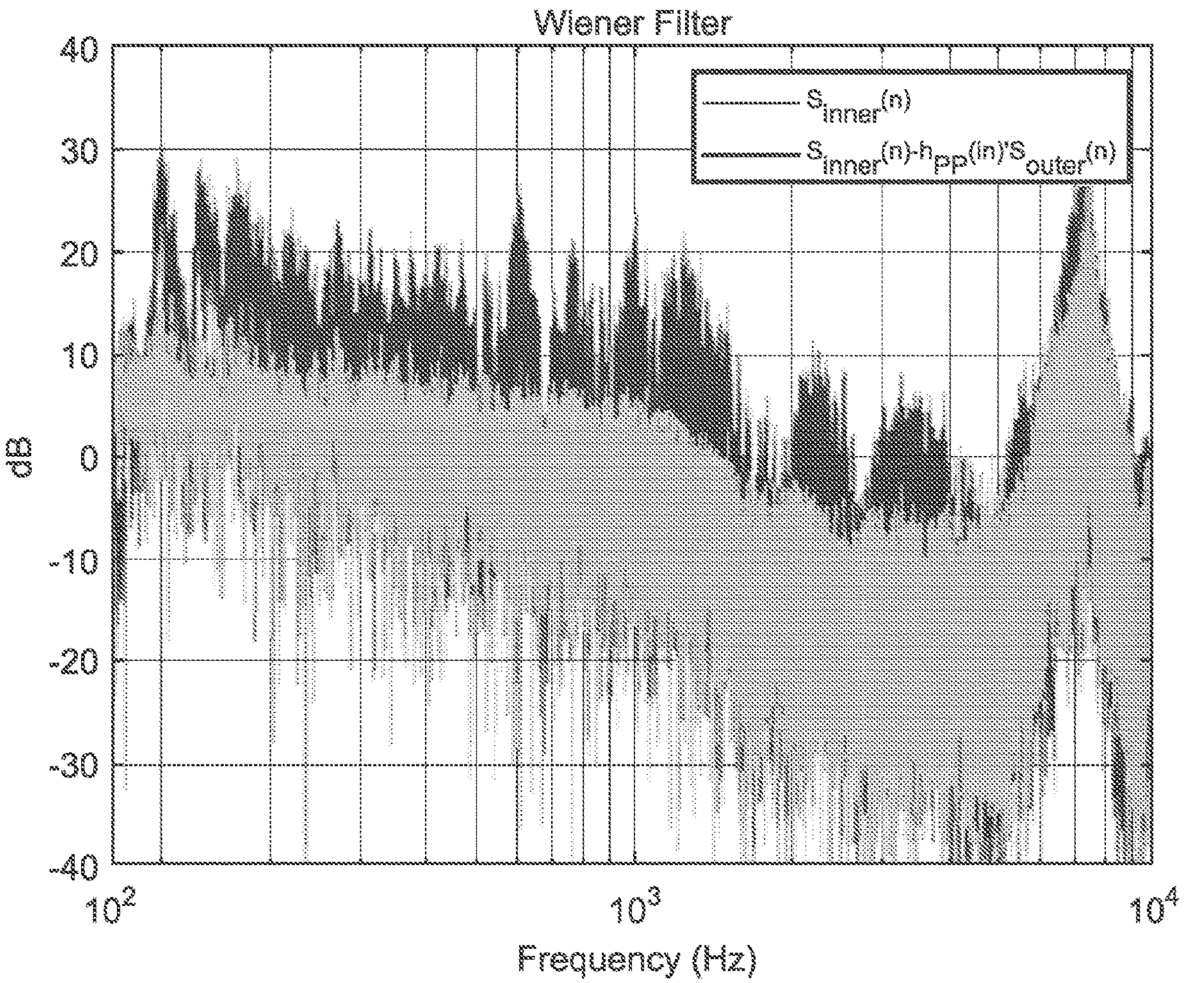

The broad-band residual error as seen in FIG. 10 remains relatively large due to the fact the non-causality could not be fully eluded. It should be noted that these residual errors are based on broadband. It is shown in FIG. 11 that the residual error at low and mid frequency ranges (e.g., the frequency range of ANC interest) is limited and the non-causal design mostly improves the performance of residual errors at high frequencies (i.e. >5 khz). This insight can be useful as the proposed spectrum shaping scheme assigns low importance to the adaptive filtering over the frequency ranges that features high dynamic resonances. Therefore, the impact of residual error over those frequency ranges can be rolled off. Given the derived responses of the primary paths based on the complex-tone measurements, a cascaded biquad transfer function can be used to conduct the IIR filter approximation using the similar SP approximation approach described above.

High-order IIR filters can be highly sensitive to quantization of filter coefficients and can easily become unstable. The instability issue is much alleviated with first and second-order filters. Higher-order filters are typically implemented as serially cascaded biquad filters. A biquad filter is a second order recursive linear filter, containing two poles and two zeros. The two poles of the biquad filter must be inside the unit circle for it to be stable.

Primary path equalization was also shown in embodiments described above. The goal of the primary path equalization is to eliminate the minimum phase part and make the group delay flat over the frequency range of interests to compensate for characteristics of the primary path. It also equalizes the dynamic range of the PP IIR filter using 1st order high-pass and low-pass filters, which effectively reduces the effective length of the impulse responses such that it fits the adaptive filtering with limited filter length. Given the characteristics of the PP responses, the cut-off frequency of the 1st order high-pass and low-pass filters may be set at around 50 Hz and 2-2.5 kHz respectively for the spectrum shaping filter. The PP equalizer may also include a minimum-phase inversion of the PP together with the high- and low-pass filters.

Figure 14:
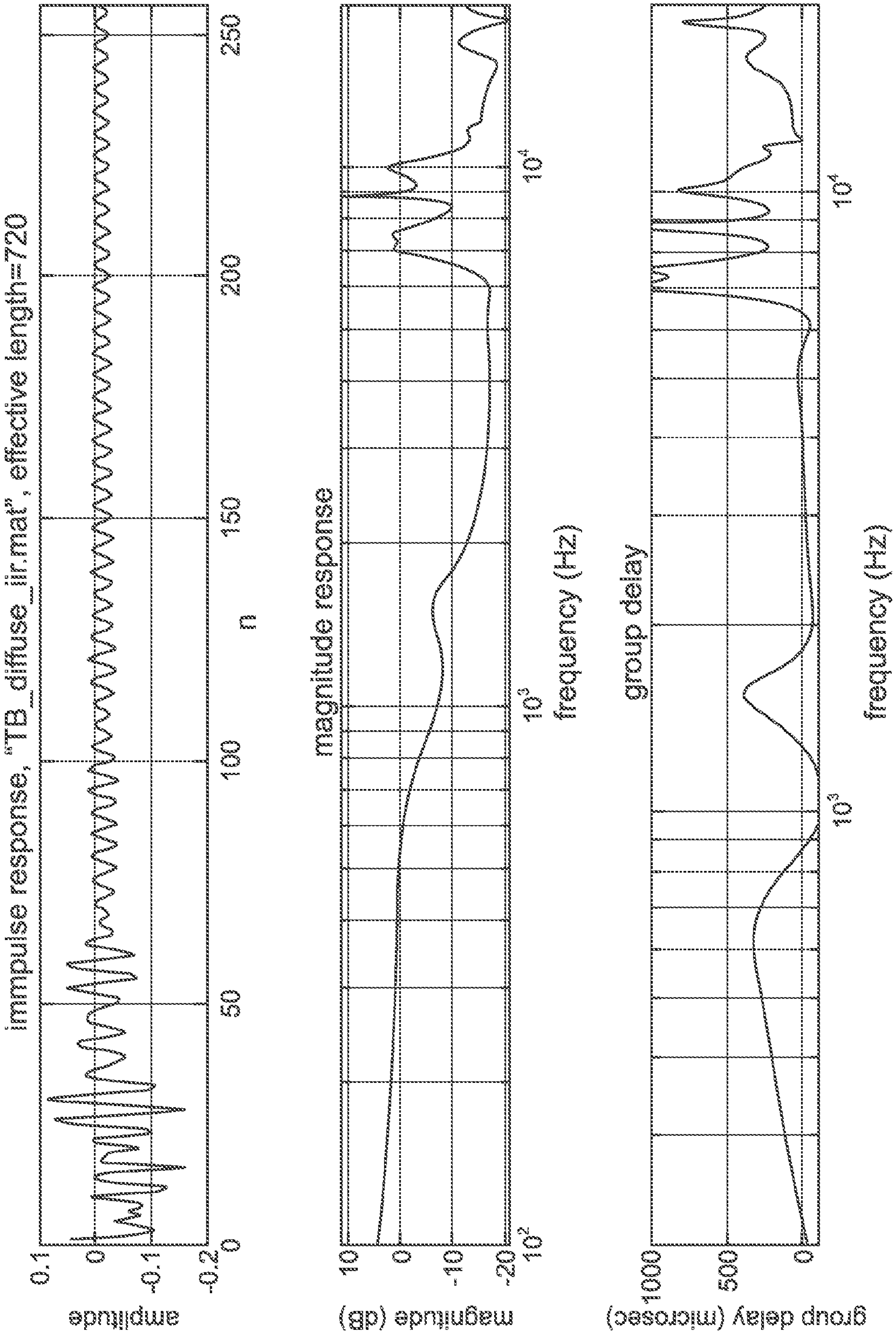
FIGS. 14 and 15 are graphs showing comparative performance of primary path impulse response filters of differing lengths according to an example embodiment.
Figure 15:
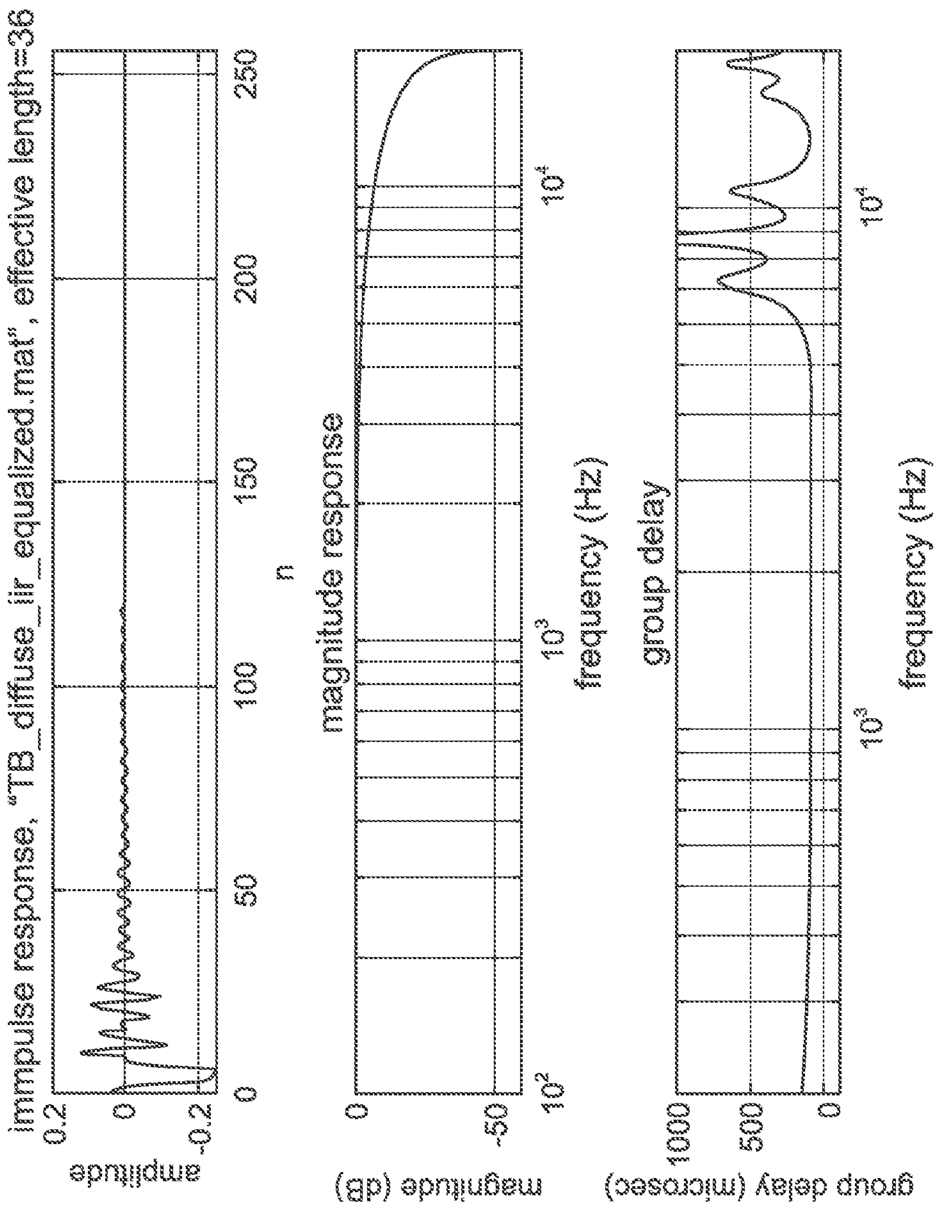

By looking into a set of formulated reference PP paths with simpler responses, e.g. lower order BR filters, it suggests that the main limiting factor for the hybrid system with practical PPs is due to the limited taps number of FIR filter in the adaptation. The wide dynamic range of the measured PPs (especially the major resonance from 6 kHz to 7 kHz) make the effective lengths for the PP impulse responses significantly longer than the normal secondary paths (or equalized secondary paths). The term "effective length N" is defined as the tap N where h(1:N) includes 98% of the energy of the impulse response h. Due to the increased spacing between microphones, the primary path is longer than the secondary path The number of taps for the FIR filter for FxNLMS adaptation may be confined to 40 due to firmware capabilities, which is insufficient to characterize the full properties of the PPs, as shown in the graphs of FIGS. 14 and 15.

Figure 12:
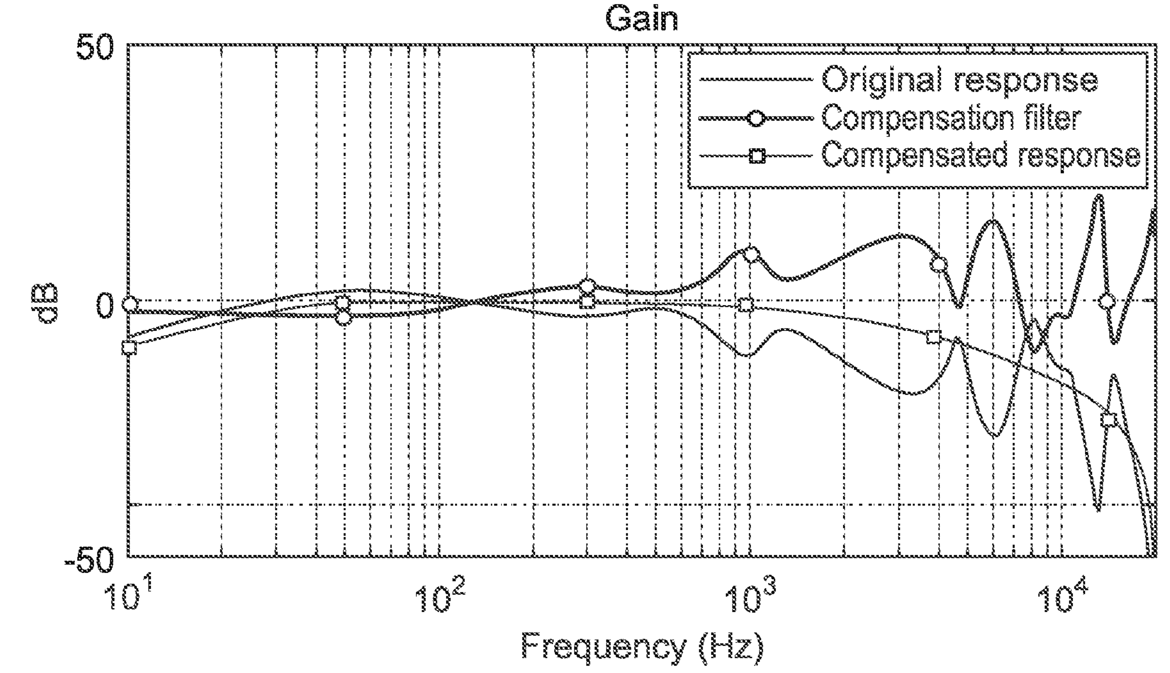
FIGS. 12 and 13 are graphs showing gain and group delay of a spectrum shaping filter used in a hearing device according to an example embodiment.
Figure 13:
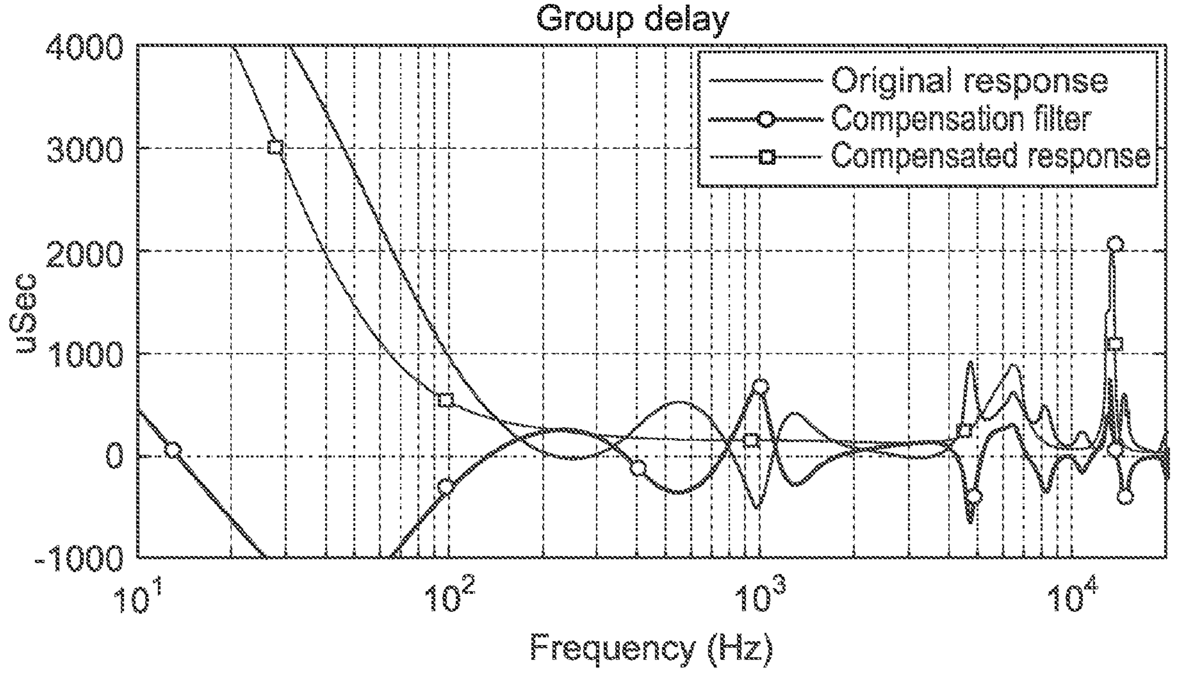

One design goal is reduces the effective length of the impulse responses such that it fits a FxNLMS system with limited filter length. However, unlike the secondary path, the primary paths are physical paths between two microphones, so the path cannot be altered by the addition of a filter, which makes it difficult to add an equalization module that equalizes the dynamic range of the PP IIR filter. One solution is to devise a spectrum shaping filter that controls the importance of adaptive filtering on different frequency ranges so that it has nulls at the primary path resonance frequencies, as well as at very low frequency ranges where the measurement is inaccurate (i.e. <50 Hz). The equalized PP (as described previous section) is used as the spectrum shaping filter. Examples of the spectrum shaping filter calculated based on real subject PP measurements are given in FIGS. 12 and 13.

Figure 16:
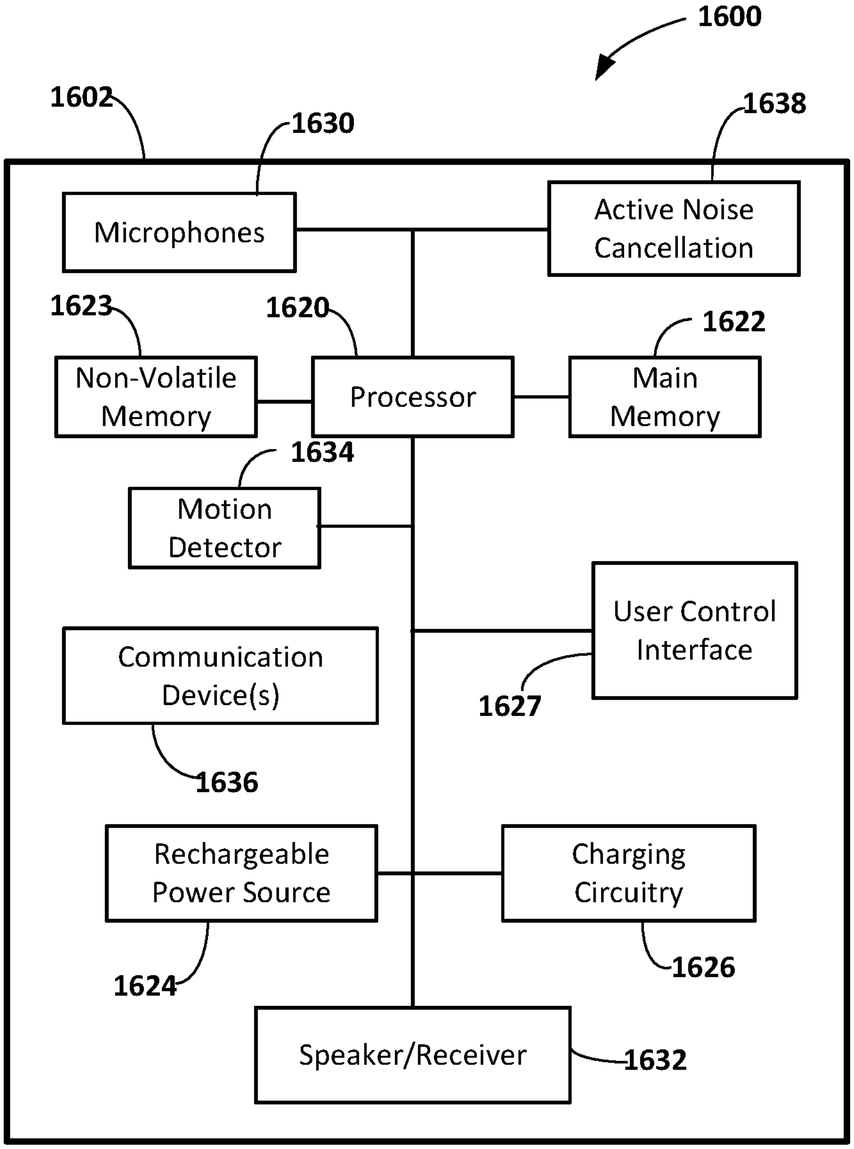
FIG. 16 is a block diagram of a hearing device according to an example embodiment.

In FIG. 16, a block diagram illustrates hardware of an ear-worn electronic device 1600 in accordance with any of the embodiments disclosed herein. The device 1600 includes a housing 1602 configured to be worn in, on, or about an ear of a wearer. The device 1600 shown in FIG. 16 can represent a single hearing device configured for monaural or single-ear operation or one of a pair of hearing devices configured for binaural or dual-ear operation. The device 1600 shown in FIG. 16 includes a housing 1602 within or on which various components are situated or supported. The housing 1602 can be configured for deployment on a wearer's ear (e.g., a behind-the-ear device housing), within an ear canal of the wearer's ear (e.g., an in-the-ear, in-the-canal, invisible-in-canal, or completely-in-the-canal device housing) or both on and in a wearer's ear (e.g., a receiver-in-canal or receiver-in-the-ear device housing).

The hearing device 1600 includes a processor 1620 operatively coupled to a main memory 1622 and a non-volatile memory 1623. The processor 1620 can be implemented as one or more of a multi-core processor, a digital signal processor (DSP), a microprocessor, a programmable controller, a general-purpose computer, a special-purpose computer, a hardware controller, a software controller, a combined hardware and software device, such as a programmable logic controller, and a programmable logic device (e.g., FPGA, ASIC). The processor 1620 can include or be operatively coupled to main memory 1622, such as RAM (e.g., DRAM, SRAM). The processor 1620 can include or be operatively coupled to non-volatile (persistent) memory 1623, such as ROM, EPROM, EEPROM or flash memory. As will be described in detail hereinbelow, the non-volatile memory 1623 is configured to store instructions that facilitate using a DNN based sound enhancer.

The hearing device 1600 includes an audio processing facility operably coupled to, or incorporating, the processor 1620. The audio processing facility includes audio signal processing circuitry (e.g., analog front-end, analog-to-digital converter, digital-to-analog converter, DSP, and various analog and digital filters), a microphone arrangement 1630, and a speaker or receiver 1632. The microphone arrangement 1630 can include one or more discrete microphones or a microphone array(s) (e.g., configured for microphone array beamforming). Each of the microphones of the microphone arrangement 1630 can be situated at different locations of the housing 1602. It is understood that the term microphone used herein can refer to a single microphone or multiple microphones unless specified otherwise.

At least one of the microphones 1630 is a reference microphone producing a reference signal in response to external sound outside an ear canal of a user. Another of the microphones 1630 is an error microphone producing an error signal in response to sound inside of the ear canal. A physical propagation path between the reference microphone and the error microphone defines a primary path of the hearing device 1600. The speaker/receiver 1632 produces amplified sound inside of the ear canal. The amplified sound propagates over a secondary path to combine with direct noise at the ear canal, the summation of which is sensed by the error microphone to produce the error signal.

The hearing device 1600 may also include a user interface with a user control interface 1627 operatively coupled to the processor 1620. The user control interface 1627 is configured to receive an input from the wearer of the hearing device 1600. The input from the wearer can be any type of user input, such as a touch input, a gesture input, or a voice input. The user control interface 1627 may be configured to receive an input from the wearer of the hearing device 1600 such as shown in FIG. 6.

The hearing device 1600 also includes an active noise cancellation module 1638 operably coupled to the processor 1620. The active noise cancellation module 1638 can be implemented in software, hardware, or a combination of hardware and software. The active noise cancellation module 1638 can be a component of, or integral to, the processor 1620 or another processor coupled to the processor 1620. The active noise cancellation module 1638 is operable to estimate a noise signal from inside the ear canal from the reference signal based on an estimate of the primary path. A residual noise signal is estimated from the error signal based on an estimate of the secondary path. The estimated noise signal from inside the ear canal and the estimated residual noise signal are input into a least mean square (LMS) algorithm that produces coefficients of an adaptive filter which is applied to the reference signal to produce an anti-noise signal. The anti-noise signal is reproduced by the receiver 1632 to actively cancel noise in the ear canal The hearing device 1600 can include one or more communication devices 1636 coupled to one or more antenna arrangements. For example, the one or more communication devices 1636 can include one or more radios that conform to an IEEE 802.11 (e.g., WiFi®) or Bluetooth® (e.g., BLE, Bluetooth® 4. 2, 5.0, 5.1, 5.2 or later) specification, for example. In addition, or alternatively, the hearing device 1600 can include a near-field magnetic induction (NFMI) sensor (e.g., an NFMI transceiver coupled to a magnetic antenna) for effecting short-range communications (e.g., ear-to-ear communications, ear-to-kiosk communications).

The hearing device 1600 also includes a power source, which can be a conventional battery, a rechargeable battery (e.g., a lithium-ion battery), or a power source comprising a supercapacitor. In the embodiment shown in FIG. 16, the hearing device 1600 includes a rechargeable power source 1624 which is operably coupled to power management circuitry for supplying power to various components of the hearing device 1600. The rechargeable power source 1624 is coupled to charging circuitry 1626. The charging circuitry 1626 is electrically coupled to charging contacts on the housing 1602 which are configured to electrically couple to corresponding charging contacts of a charging unit when the hearing device 1600 is placed in the charging unit.

Figure 17:
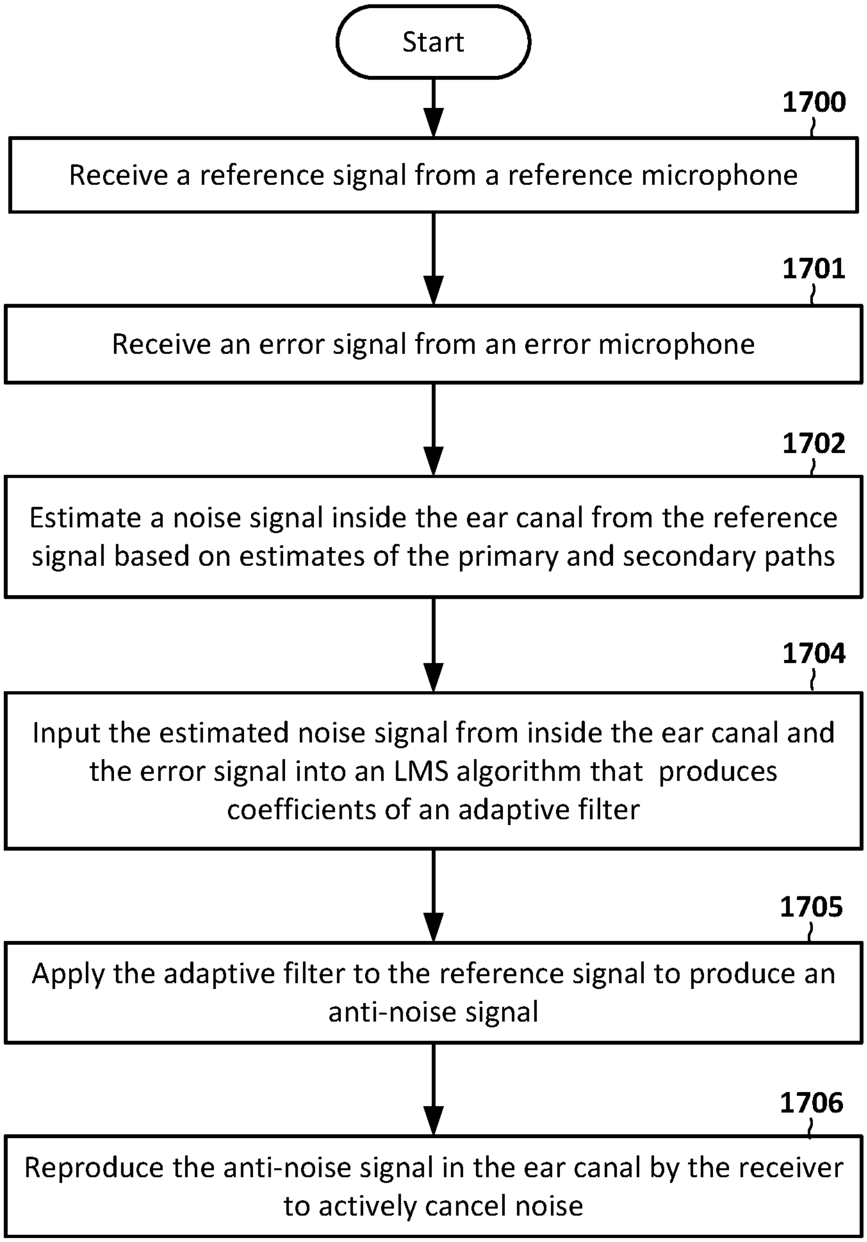
FIG. 17 is a flowchart of a method according to an example embodiment.

In FIG. 17, a flowchart shows a method according to example embodiment. Generally, the method can be implemented within an infinite loop in a hearing device. As shown in FIG. 17, a method involves receiving 1700 a reference signal from a reference microphone in response to external sound outside an ear canal of a user. An error signal is received 1701 from an error microphone in response to sound inside of the ear canal. A physical propagation path between the reference microphone and the error microphone defines a primary path. Amplified sound produced inside of the ear canal by a receiver propagates over a secondary path to combine with direct noise at the ear canal, the summation of which is sensed by the error microphone to produce the error signal;

A noise signal inside the ear canal is estimated 1702 from the reference signal that is filtered by an equalization filter, the equalization filter being based on an estimate of the secondary path. The reference signal is also filtered by a spectrum shaping filter that is based on an estimate of the primary path. The estimated noise signal from inside the ear canal and the error signal are input 1704 into a least mean square (LMS) algorithm, the LMS algorithm producing coefficients of an adaptive filter. The adaptive filter is applied 1705 to the reference signal to produce an anti-noise signal. The anti-noise signal is reproduced 1706 by the receiver to actively cancel noise in the ear canal.

This document discloses numerous embodiments, including but not limited to the following: Embodiment 1 is an ear-wearable device, comprising: a reference microphone producing a reference signal in response to external sound outside an ear canal of a user; an error microphone producing an error signal in response to sound inside of the ear canal, wherein a physical propagation path between the reference microphone and the error microphone defines a primary path; a receiver that produces amplified sound inside of the ear canal, wherein the amplified sound propagates over a secondary path to combine with direct noise at the ear canal, the combination/summation of which is sensed by the error microphone to produce the error signal; a processor coupled to the reference microphone, the error microphone, and the receiver, the processor operable via instructions to: estimate a noise signal from inside the ear canal from the reference signal by filtering with an equalization filter that is based on an estimate of the secondary path and by filtering with a spectrum shaping filter that is based on an estimate of the primary path; input the estimated noise signal from inside the ear canal and the error signal into a least mean square (LMS) algorithm, the LMS algorithm producing coefficients of an adaptive filter; and apply the adaptive filter to the reference signal to produce an anti-noise signal, the anti-noise signal being reproduced by the receiver to actively cancel noise in the ear canal.

Embodiment 2 includes the ear-wearable device of embodiment 1, wherein the LMS algorithm comprises a normalized least mean square (NLMS) algorithm. Embodiment 3 includes the ear-wearable device of embodiment 2, wherein the NLMS algorithm comprises a filtered-x NLMS algorithm. Embodiment 4 includes the ear-wearable device of any one of embodiments 1-3, wherein the reference signal is downsampled, the estimated noise signal from inside the ear canal being estimated based on the downsampled reference signal.

Embodiment 5 includes the ear-wearable device of any one of embodiments 1-4, wherein the error signal is downsampled, the estimated residual noise signal being estimated based on the downsampled error signal. Embodiment 6 includes the ear-wearable device of any one of embodiments 1-5, wherein the adaptive filter comprises a finite-impulse response filter with 40 or fewer taps.

Embodiment 7 includes the ear-wearable device of any one of embodiments 1-6, wherein the spectrum shaping filter reduces effects of high-frequency resonances in the primary path. Embodiment 8 includes the ear-wearable device of embodiment 7, wherein the spectrum shaping filter further deemphasizes low frequencies where the response of the receiver is low. Embodiment 9 includes the ear-wearable device of embodiment 7, wherein the spectrum shaping filter comprises a cascaded biquad filter.

Embodiment 10 includes the ear-wearable device any one of embodiments 1-9, wherein the estimated noise signal from inside the ear canal is equalized via an equalization filter that inverses a minimum phase part of the estimated noise signal from inside the ear canal and applies low-pass and high-pass filters, wherein cutoff frequencies of the low-pass and high-pass filters are determined by characteristics of the secondary path. Embodiment 11 includes the ear-wearable device of any one of embodiments 1-10, wherein the processor is further configured to estimate the secondary path via a calibration process comprising: sending a stimulus signal to the receiver, the stimulus signal comprising a combination of tones at a selected set of frequencies; measuring, via the error microphone, an error microphone signal that is produced in response to the stimulus signal; and determining a transfer function between the stimulus signal and the error microphone signal, the transfer function being stored in a memory of the ear-wearable device and used as the estimate of the secondary path.

Embodiment 12 includes the ear-wearable device of embodiment 11, wherein the error signal is averaged in the time domain before determining the transfer function. Embodiment 13 includes the ear-wearable device of embodiment 11, wherein the tones have differing magnitudes that emphasize low frequencies. Embodiment 14 includes the ear-wearable device of any one of embodiments 1-10, wherein the processor is further configured to estimate the primary path via a calibration process comprising: receiving a stimulus signal via the external reference microphone, the stimulus signal generated in response to a combination of tones at a selected set of frequencies rendered via a headset worn over the ear-wearable device; determining a response to the stimulus signal at the error microphone; and determining a transfer function between the external microphone and the error microphone, the transfer function being stored in a memory of the ear-wearable device and used as the estimate of the primary path. Embodiment 15 includes the ear-wearable device of embodiment any one of embodiments 1-14, wherein the processor is further configured to: modify the reference signal to produce an enhanced hearing signal that compensates for hearing loss; and combine the enhanced hearing signal with the anti-noise at the receiver.

Embodiment 16 is a method, comprising: receiving a reference signal from a reference microphone in response to external sound outside an ear canal of a user; receiving an error signal from an error microphone in response to sound inside of the ear canal, wherein a physical propagation path between the reference microphone and the error microphone defines a primary path, and wherein amplified sound produced inside of the ear canal by a receiver propagates over a secondary path to combine with direct noise at the ear canal, the summation of which is sensed by the error microphone to produce the error signal; estimating a noise signal inside the ear canal from the reference signal by filtering with an equalization filter that is based on an estimate of the secondary path and by filtering with a spectrum shaping filter that is based on an estimate of the primary path; inputting the estimated noise signal from inside the ear canal and the error signal into a least mean square (LMS) algorithm, the LMS algorithm producing coefficients of an adaptive filter; applying the adaptive filter to the reference signal to produce an anti-noise signal; and reproducing the anti-noise signal in the ear canal by the receiver to actively cancel noise.

Embodiment 17 includes the method of embodiment 16, wherein the LMS algorithm comprises a normalized least mean square (NLMS) algorithm. Embodiment 18 includes the method of embodiment 17, wherein the NLMS algorithm comprises a filtered-x NLMS algorithm. Embodiment 19 includes the method of any one of embodiments 16-18, further comprising downsampling the reference signal, wherein the estimated noise signal from inside the ear canal is estimated based on the downsampled reference signal. Embodiment 20 includes the method of any one of embodiments 16-19, further comprising downsampling the error signal, and wherein the estimated residual noise signal is estimated based on the downsampled error signal.

Embodiment 21 includes the method of any one of embodiments 16-20, wherein the adaptive filter comprises a finite-impulse response filter with 40 or fewer taps. Embodiment 22 includes the method of any one of embodiments 16-21, wherein the spectrum shaping filter reduces effects of high-frequency resonances in the primary path. Embodiment 23 includes the method of embodiment 22, wherein the spectrum shaping filter further deemphasizes low frequencies where the response of the receiver is low. Embodiment 24 includes the method of embodiment 22, wherein the spectrum shaping filter comprises a cascaded biquad filter.

Embodiment 25 includes the method of any one of embodiments 16-24, further comprising equalizing the estimated noise signal from inside the ear canal via an equalization filter that inverses a minimum phase part of the estimated noise signal from inside the ear canal and applies low-pass and high-pass filters, wherein cutoff frequencies of the low-pass and high-pass filters are determined by characteristics of the secondary path.

Embodiment 26 includes the method of any one of embodiments 16-25, further comprising: sending a stimulus signal to the receiver, the stimulus signal comprising a combination of tones at a selected set of frequencies; measuring, via the error microphone, an error microphone signal that is produced in response to the stimulus signal; and determining a transfer function between the stimulus signal and the error microphone signal, the transfer function being stored in a memory of the method and used as the estimate of the secondary path.

Embodiment 27 includes the method of embodiment 26, further comprising averaging the error signal in the time domain before determining the transfer function. Embodiment 28 includes the method of embodiment 26, wherein the tones have differing magnitudes that emphasize low frequencies. Embodiment 29 includes the method of any one of embodiments 16-25, further comprising: receiving a stimulus signal via the external reference microphone, the stimulus signal generated in response to a combination of tones at a selected set of frequencies rendered via a headset worn over the ear-wearable device; determining a response to the stimulus signal at the error microphone; and determining a transfer function between the external microphone and the error microphone, the transfer function being stored in a memory of the ear-wearable device and used as the estimate of the primary path. Embodiment 30 includes the method of any one of embodiments 16-29, further comprising: modifying the reference signal to produce an enhanced hearing signal that compensates for hearing loss; and combining the enhanced hearing signal with the anti-noise at the receiver.

Although reference is made herein to the accompanying set of drawings that form part of this disclosure, one of at least ordinary skill in the art will appreciate that various adaptations and modifications of the embodiments described herein are within, or do not depart from, the scope of this disclosure. For example, aspects of the embodiments described herein may be combined in a variety of ways with each other. Therefore, it is to be understood that, within the scope of the appended claims, the claimed invention may be practiced other than as explicitly described herein.

All references and publications cited herein are expressly incorporated herein by reference in their entirety into this disclosure, except to the extent they may directly contradict this disclosure. Unless otherwise indicated, all numbers expressing feature sizes, amounts, and physical properties used in the specification and claims may be understood as being modified either by the term "exactly" or "about." Accordingly, unless indicated to the contrary, the numerical parameters set forth in the foregoing specification and attached claims are approximations that can vary depending upon the desired properties sought to be obtained by those skilled in the art utilizing the teachings disclosed herein or, for example, within typical ranges of experimental error.

The recitation of numerical ranges by endpoints includes all numbers subsumed within that range (e.g. 1 to 5 includes 1, 1.5, 2, 2.75, 3, 3.80, 4, and 5) and any range within that range. Herein, the terms "up to" or "no greater than" a number (e.g., up to 50) includes the number (e.g., 50), and the term "no less than" a number (e.g., no less than 5) includes the number (e.g., 5).

The terms "coupled" or "connected" refer to elements being attached to each other either directly (in direct contact with each other) or indirectly (having one or more elements between and attaching the two elements). Either term may be modified by "operatively" and "operably," which may be used interchangeably, to describe that the coupling or connection is configured to allow the components to interact to carry out at least some functionality (for example, a radio chip may be operably coupled to an antenna element to provide a radio frequency electric signal for wireless communication).

Terms related to orientation, such as "top," "bottom," "side," and "end," are used to describe relative positions of components and are not meant to limit the orientation of the embodiments contemplated. For example, an embodiment described as having a "top" and "bottom" also encompasses embodiments thereof rotated in various directions unless the content clearly dictates otherwise.

Reference to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

As used herein, "have," "having," "include," "including," "comprise," "comprising" or the like are used in their open-ended sense, and generally mean "including, but not limited to." It will be understood that "consisting essentially of," "consisting of," and the like are subsumed in "comprising," and the like. The term "and/or" means one or all of the listed elements or a combination of at least two of the listed elements.

The phrases "at least one of," "comprises at least one of," and "one or more of" followed by a list refers to any one of the items in the list and any combination of two or more items in the list.

The invention claimed is:

1. An ear-wearable device, comprising:

a reference microphone producing a reference signal in response to external sound outside an ear canal of a user;

an error microphone locatable within the ear canal and producing an error signal in response to sound inside of the ear canal, wherein a physical propagation path between the reference microphone and the error microphone defines a primary path;

a speaker locatable within the ear canal that produces amplified sound inside of the ear canal, wherein the amplified sound propagates over a secondary path to combine with direct noise at the ear canal, the combination of which is sensed by the error microphone to produce the error signal;

a processor coupled to the reference microphone, the error microphone, and the speaker; the processor operable via instructions to:

estimate a noise signal from inside the ear canal from the reference signal by filtering with an equalization filter that is based on an estimate of the secondary path and by filtering with a spectrum shaping filter that is based on an estimate of the primary path, wherein the spectrum shaping filter reduces effects of high-frequency resonances in the primary path;

input the estimated noise signal from inside the ear canal and the error signal into a least mean square (LMS) algorithm, the LMS algorithm producing coefficients of an adaptive filter; and apply the adaptive filter to the reference signal to produce an anti-noise signal, the anti-noise signal being reproduced by the speaker to actively cancel noise in the ear canal.

2. The ear-wearable device of claim 1, wherein the LMS algorithm comprises a normalized least mean square (NLMS) algorithm.

3. The ear-wearable device of claim 2, wherein the NLMS algorithm comprises a filtered-x NLMS algorithm.

4. The ear-wearable device of claim 1, wherein the reference signal is downsampled, the estimated noise signal from inside the ear canal being estimated based on the downsampled reference signal.

5. The ear-wearable device of claim 1, wherein the error signal is downsampled, the estimated residual noise signal being estimated based on the downsampled error signal.

6. The ear-wearable device of claim 1, wherein the adaptive filter comprises a finite-impulse response filter with 40 or fewer taps.

7. The ear-wearable device of claim 1, reducing the effects of the high-frequency resonances in the primary path comprises low-pass filtering with a cutoff frequency of about 2-2.5 kHz.

8. The ear-wearable device of claim 7, wherein the spectrum shaping filter further deemphasizes low frequencies where the response of the speaker is low.

9. The ear-wearable device of claim 7, wherein the spectrum shaping filter comprises a cascaded biquad filter.

10. The ear-wearable device of claim 1, wherein the equalization filter inverses a minimum phase part of the estimated noise signal from inside the ear canal and applies low-pass and high-pass filters, wherein cutoff frequencies of the low-pass and high-pass filters are determined by characteristics of the secondary path.

11. The ear-wearable device of claim 1, wherein the processor is further configured to estimate the secondary path via a calibration process comprising:

sending a stimulus signal to the speaker, the stimulus signal comprising a combination of tones at a selected set of frequencies;

measuring, via the error microphone, an error microphone signal that is produced in response to the stimulus signal; and determining a transfer function between the stimulus signal and the error microphone signal, the transfer function being stored in a memory of the ear-wearable device and used as the estimate of the secondary path.

12. The ear-wearable device of claim 11, wherein the error signal is averaged in a time domain before determining the transfer function.

13. The ear-wearable device of claim 11, wherein the tones have differing magnitudes that emphasize low frequencies.

14. The ear-wearable device of claim 1, wherein the processor is further configured to estimate the primary path via a calibration process comprising:

receiving a stimulus signal via the external reference microphone, the stimulus signal generated in response to a combination of tones at a selected set of frequencies rendered via a headset worn over the ear-wearable device;

determining a response to the stimulus signal at the error microphone; and determining a transfer function between the external microphone and the error microphone, the transfer function being stored in a memory of the ear-wearable device and used as the estimate of the primary path.

15. The ear-wearable device of claim 1, wherein the processor is further configured to:

modify the reference signal to produce an enhanced hearing signal that compensates for hearing loss; and combine the enhanced hearing signal with the anti-noise at the speaker.

16. A method of active noise cancellation via an ear-wearable device, comprising:

receiving a reference signal from a reference microphone in response to external sound outside an ear canal of a user;

receiving an error signal from an error microphone in response to sound inside of the ear canal, wherein the error microphone is located within the ear canal and a physical propagation path between the reference microphone and the error microphone defines a primary path, and wherein amplified sound produced inside of the ear canal by a speaker located within the ear canal propagates over a secondary path to combine with direct noise at the ear canal, the combination of which is sensed by the error microphone to produce the error signal;

estimating a noise signal inside the ear canal from the reference signal by filtering with an equalization filter that is based on an estimate of the secondary path and by filtering with a spectrum shaping filter that is based on an estimate of the primary path, wherein the spectrum shaping filter reduces effects of high-frequency resonances in the primary path and deemphasizes low frequencies where the response of the speaker is low;

inputting the estimated noise signal from inside the ear canal and the error signal into a least mean square (LMS) algorithm, the LMS algorithm producing coefficients of an adaptive filter;

applying the adaptive filter to the reference signal to produce an anti-noise signal; and reproducing the anti-noise signal in the ear canal by the speaker to actively cancel noise.

17. The method of claim 16, further comprising equalizing the estimated noise signal from inside the ear canal via an equalization filter that inverses a minimum phase part of the estimated noise signal from inside the ear canal and applies low-pass and high-pass filters, wherein cutoff frequencies of the low-pass and high-pass filters are determined by characteristics of the secondary path.

18. The method of claim 16, further comprising:

sending a stimulus signal to the speaker, the stimulus signal comprising a combination of tones at a selected set of frequencies;

measuring, via the error microphone, an error microphone signal that is produced in response to the stimulus signal; and determining a transfer function between the stimulus signal and the error microphone signal, the transfer function being stored in a memory of the method and used as the estimate of the secondary path.

19. The method of claim 16, further comprising:

receiving a stimulus signal via the external reference microphone, the stimulus signal generated in response to a combination of tones at a selected set of frequencies rendered via a headset worn over the ear-wearable device;

determining a response to the stimulus signal at the error microphone; and determining a transfer function between the external microphone and the error microphone, the transfer function being stored in a memory of the ear-wearable device and used as the estimate of the primary path.

20. The method of claim 16, further comprising:

modifying the reference signal to produce an enhanced hearing signal that compensates for hearing loss; and combining the enhanced hearing signal with the anti-noise at the speaker.

* * * * *